United States Patent
Hassan et al.

(10) Patent No.: US 9,801,074 B2
(45) Date of Patent: *Oct. 24, 2017

(54) COGNITIVE USE OF MULTIPLE REGULATORY DOMAINS

(71) Applicant: Microsoft Technology Licensing, LLC, Redmond, WA (US)

(72) Inventors: Amer A. Hassan, Kirkland, WA (US); Danny Allen Reed, Iowa City, IA (US); Trenholme J. Griffin, Bainbridge Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,348

(22) Filed: Aug. 10, 2016

(65) Prior Publication Data

US 2016/0353287 A1 Dec. 1, 2016

Related U.S. Application Data

(63) Continuation of application No. 14/863,290, filed on Sep. 23, 2015, now Pat. No. 9,462,479, which is a
(Continued)

(51) Int. Cl.
*H04B 7/12* (2006.01)
*H04W 16/14* (2009.01)
(Continued)

(52) U.S. Cl.
CPC ............ *H04W 16/14* (2013.01); *H04B 1/005* (2013.01); *H04B 7/12* (2013.01); *H04B 15/00* (2013.01);
(Continued)

(58) Field of Classification Search
CPC .................................. H04B 7/12; H04W 16/14
See application file for complete search history.

(56) References Cited

U.S. PATENT DOCUMENTS 4,949,299 A  8/1990 Pickett
5,574,964 A  11/1996 Hamlin
(Continued)

FOREIGN PATENT DOCUMENTS

CN  1571341 A  1/2005
CN  1592210 A  3/2005
(Continued)

OTHER PUBLICATIONS

"International Search Report", Mailed Date: Aug. 14, 2012, Application No. PCT/US2011/065276, Filed Date: Dec. 15, 2011, pp. 9.
(Continued)

*Primary Examiner* — Tuan H Nguyen
(74) *Attorney, Agent, or Firm* — Davin Chin; Chin IP, PLLC

(57) ABSTRACT

A wireless communication system that concurrently communicates information in multiple regulatory domains to facilitate audio/video media streaming and other high bandwidth operations. One domain may be licensed and the other may be unlicensed. Transmission in the licensed domain may occur in white space in the domain, and the amount of information transmitted in that domain may be limited by regulations. The amount of information conveyed in the licensed domain may also depend on channel conditions in either or both of the domains. As a result, the relative amount of information transmitted in each domain may vary dynamically. The system includes a transmitter that dynamically determines weighting coefficients applied to each of a plurality of channels to set power levels in both domains to achieve a desired metric for the overall communication. A
(Continued)

corresponding receiver assembles the substreams into a stream that can then be displayed or otherwise processed.

20 Claims, 8 Drawing Sheets

Related U.S. Application Data continuation of application No. 14/458,203, filed on Aug. 12, 2014, now Pat. No. 9,178,652, which is a continuation of application No. 12/964,492, filed on Dec. 9, 2010, now Pat. No. 8,923,770.

(51) Int. Cl.
| | |
|---|---|
| H04L 1/00 | (2006.01) |
| H04B 15/00 | (2006.01) |
| H04L 29/06 | (2006.01) |
| H04B 1/00 | (2006.01) |
| H04W 72/04 | (2009.01) |
| H04W 88/06 | (2009.01) |

(52) U.S. Cl.
CPC .......... *H04L 1/0023* (2013.01); *H04L 1/0033* (2013.01); *H04L 1/0034* (2013.01); *H04L 65/60* (2013.01); *H04L 2001/0096* (2013.01); *H04W 72/04* (2013.01); *H04W 88/06* (2013.01)

(56) References Cited

U.S. PATENT DOCUMENTS

| | | | |
|---|---|---|---|
| 5,682,382 A | 10/1997 | Shepard | |
| 5,689,825 A | 11/1997 | Averbuch et al. | |
| 5,729,682 A | 3/1998 | Marquis et al. | |
| 5,963,915 A | 10/1999 | Kirsch | |
| 5,966,441 A | 10/1999 | Calamera | |
| 6,288,749 B1 | 9/2001 | Freadman | |
| 6,317,490 B1 | 11/2001 | Cameron et al. | |
| 6,338,046 B1 | 1/2002 | Saari et al. | |
| 6,343,205 B1 | 1/2002 | Threadgill et al. | |
| 6,553,060 B2 | 4/2003 | Souissi et al. | |
| 6,628,965 B1 | 9/2003 | Larosa et al. | |
| 6,665,709 B1 | 12/2003 | Barron | |
| 6,711,617 B1 | 3/2004 | Bantz et al. | |
| 6,789,228 B1 | 9/2004 | Merril et al. | |
| 6,823,379 B1 | 11/2004 | Heckel et al. | |
| 7,020,472 B2 | 3/2006 | Schmidt | |
| 7,027,808 B2 | 4/2006 | Wesby | |
| 7,058,696 B1 | 6/2006 | Phillips et al. | |
| 7,107,009 B2 | 9/2006 | Sairanen et al. | |
| 7,110,843 B2 | 9/2006 | Pagnano et al. | |
| 7,177,288 B2 | 2/2007 | Mooney et al. | |
| 7,194,278 B1 | 3/2007 | Cook | |
| 7,274,911 B2 * | 9/2007 | Li ..................... | H04W 48/18 455/41.2 |
| 7,280,978 B1 | 10/2007 | Joao | |
| 7,290,132 B2 | 10/2007 | Aboba et al. | |
| 7,349,342 B2 | 3/2008 | Carpenter et al. | |
| 7,400,253 B2 | 7/2008 | Cohen | |
| 7,412,534 B2 | 8/2008 | Tsang et al. | |
| 7,454,191 B2 | 11/2008 | Dawson et al. | |
| 7,460,253 B2 | 12/2008 | Osada | |
| 7,461,253 B2 | 12/2008 | Braskich et al. | |
| 7,496,637 B2 | 2/2009 | Han et al. | |
| 7,512,401 B2 | 3/2009 | Muhonen et al. | |
| 7,558,604 B2 | 7/2009 | Narayanaswami et al. | |
| 7,562,129 B1 | 7/2009 | Lee et al. | |
| 7,577,125 B2 | 8/2009 | Abhishek et al. | |
| 7,580,678 B2 | 8/2009 | Byman-Kivivuori et al. | |
| 7,584,296 B2 | 9/2009 | Sun et al. | |
| 7,589,693 B2 | 9/2009 | Locke | |
| 7,640,213 B2 | 12/2009 | Reunert et al. | |
| 7,721,093 B2 | 5/2010 | Sundararajan | |
| 7,729,689 B2 | 6/2010 | Chakraborty et al. | |
| 7,751,317 B2 | 7/2010 | Toyama et al. | |
| 7,769,394 B1 | 8/2010 | Zhu | |
| 7,783,019 B2 | 8/2010 | Mahone et al. | |
| 7,792,920 B2 | 9/2010 | Istvan et al. | |
| 7,925,739 B2 | 4/2011 | Kocho et al. | |
| 7,962,854 B2 | 6/2011 | Vance et al. | |
| 7,991,770 B2 | 8/2011 | Covell et al. | |
| 8,014,415 B2 | 9/2011 | Alapuranen | |
| 8,095,111 B2 | 1/2012 | Henry, Jr. et al. | |
| 8,098,803 B1 | 1/2012 | Croak et al. | |
| 8,204,013 B2 * | 6/2012 | Lewis ................. | H04B 1/0053 370/208 |
| 8,239,516 B2 | 8/2012 | Huslak et al. | |
| 8,254,878 B2 | 8/2012 | Howard et al. | |
| 8,254,992 B1 | 8/2012 | Ashenbrenner et al. | |
| 8,260,998 B2 | 9/2012 | Ganesh et al. | |
| 8,285,250 B2 | 10/2012 | Rubin et al. | |
| 8,323,040 B2 | 12/2012 | Prest | |
| 8,326,958 B1 | 12/2012 | Raleigh | |
| 8,375,328 B2 | 2/2013 | Koh et al. | |
| 8,397,982 B2 | 3/2013 | Slaby et al. | |
| 8,437,736 B2 | 5/2013 | Rubin et al. | |
| 8,479,225 B2 | 7/2013 | Covell et al. | |
| 8,493,931 B1 | 7/2013 | Nix | |
| 8,565,928 B2 | 10/2013 | Venkatakrishnan et al. | |
| 8,577,329 B2 | 11/2013 | Momtahan et al. | |
| 8,589,991 B2 | 11/2013 | Hassan et al. | |
| 8,606,911 B2 | 12/2013 | Raleigh et al. | |
| 8,621,097 B2 | 12/2013 | Venkatakrishnan et al. | |
| 8,633,616 B2 | 1/2014 | Soar | |
| 8,659,565 B2 | 2/2014 | Sirpal et al. | |
| 8,700,641 B2 | 4/2014 | Covell et al. | |
| 8,792,429 B2 | 7/2014 | Hassan et al. | |
| 8,813,201 B2 | 8/2014 | Lambert et al. | |
| 8,892,691 B2 | 11/2014 | Pantos et al. | |
| 8,971,841 B2 | 3/2015 | Menezes et al. | |
| 8,977,731 B2 | 3/2015 | Venkatakrishnan et al. | |
| 8,984,628 B2 | 3/2015 | Mahaffey et al. | |
| 9,008,610 B2 | 4/2015 | Menezes et al. | |
| 9,009,828 B1 | 4/2015 | Ramsey et al. | |
| 9,148,238 B2 | 9/2015 | Dureau | |
| 9,178,652 B2 | 11/2015 | Hassan et al. | |
| 9,237,366 B2 | 1/2016 | Schaffer et al. | |
| 9,392,462 B2 | 7/2016 | Raleigh et al. | |
| 9,450,995 B2 | 9/2016 | Hassan et al. | |
| 9,542,203 B2 | 1/2017 | Hassan et al. | |
| 9,596,220 B2 | 3/2017 | Hassan et al. | |
| 2001/0021950 A1 | 9/2001 | Hawley et al. | |
| 2001/0037399 A1 | 11/2001 | Eylon et al. | |
| 2001/0042124 A1 | 11/2001 | Barron | |
| 2001/0046298 A1 | 11/2001 | Terada et al. | |
| 2001/0052052 A1 | 12/2001 | Peng | |
| 2002/0067268 A1 | 6/2002 | Lee et al. | |
| 2002/0116485 A1 | 8/2002 | Black et al. | |
| 2002/0120935 A1 | 8/2002 | Huber et al. | |
| 2002/0143819 A1 | 10/2002 | Han et al. | |
| 2002/0154751 A1 | 10/2002 | Thompson et al. | |
| 2002/0156876 A1 | 10/2002 | Hartman et al. | |
| 2002/0183038 A1 | 12/2002 | Comstock et al. | |
| 2003/0142651 A1 | 7/2003 | Matta et al. | |
| 2003/0187992 A1 | 10/2003 | Steenfeldt et al. | |
| 2003/0231586 A1 | 12/2003 | Chheda | |
| 2004/0002305 A1 | 1/2004 | Byman-Kivivuori et al. | |
| 2004/0002326 A1 | 1/2004 | Maher | |
| 2004/0006606 A1 | 1/2004 | Marotta et al. | |
| 2004/0049576 A1 | 3/2004 | Schweitzer et al. | |
| 2004/0061716 A1 | 4/2004 | Cheung et al. | |
| 2004/0128363 A1 | 7/2004 | Yamagami et al. | |
| 2004/0174395 A1 | 9/2004 | Liu | |
| 2004/0198374 A1 | 10/2004 | Bajikar | |
| 2004/0203815 A1 | 10/2004 | Shoemake et al. | |
| 2004/0205154 A1 | 10/2004 | Dalton et al. | |
| 2004/0210320 A1 | 10/2004 | Pandya | |
| 2004/0260630 A1 | 12/2004 | Benco et al. | |
| 2005/0028208 A1 | 2/2005 | Ellis et al. | |
| 2005/0071319 A1 | 3/2005 | Kelley et al. | |
| 2005/0083975 A1 | 4/2005 | Macri | |
| 2005/0085222 A1 | 4/2005 | Przybilski et al. | |

(56) References Cited

U.S. PATENT DOCUMENTS

| | | |
|---|---|---|
| 2005/0097248 A1 | 5/2005 | Kelley |
| 2005/0105632 A1 | 5/2005 | Catreux-Erces et al. |
| 2005/0135235 A1 | 6/2005 | Maruyama et al. |
| 2005/0136886 A1 | 6/2005 | Aarnio et al. |
| 2005/0136920 A1 | 6/2005 | Rink et al. |
| 2005/0159179 A1 | 7/2005 | Sainton et al. |
| 2005/0174962 A1 | 8/2005 | Gurevich |
| 2005/0177715 A1 | 8/2005 | Somin et al. |
| 2005/0198238 A1 | 9/2005 | Sim et al. |
| 2005/0221844 A1 | 10/2005 | Trethewey et al. |
| 2005/0223226 A1 | 10/2005 | Sundararajan |
| 2005/0229246 A1 | 10/2005 | Rajagopal et al. |
| 2005/0249266 A1 | 11/2005 | Brown et al. |
| 2006/0015904 A1 | 1/2006 | Marcus |
| 2006/0041916 A1 | 2/2006 | Mcquaide |
| 2006/0059462 A1 | 3/2006 | Yamamoto |
| 2006/0107036 A1 | 5/2006 | Randle et al. |
| 2006/0143027 A1 | 6/2006 | Jagannathan et al. |
| 2006/0145815 A1 | 7/2006 | Lanzieri et al. |
| 2006/0171304 A1 | 8/2006 | Hill et al. |
| 2006/0200678 A1 | 9/2006 | Yamada et al. |
| 2006/0239208 A1 | 10/2006 | Roberts et al. |
| 2006/0290519 A1 | 12/2006 | Boate et al. |
| 2006/0294112 A1 | 12/2006 | Mandato et al. |
| 2007/0054616 A1 | 3/2007 | Culbert |
| 2007/0057793 A1 | 3/2007 | Alden |
| 2007/0064604 A1 | 3/2007 | Chen et al. |
| 2007/0124485 A1 | 5/2007 | Frost et al. |
| 2007/0124756 A1 | 5/2007 | Covell et al. |
| 2007/0153695 A1 | 7/2007 | Gholmieh et al. |
| 2007/0153729 A1 | 7/2007 | Alapuranen |
| 2007/0161411 A1 | 7/2007 | Liao et al. |
| 2007/0171915 A1 | 7/2007 | Toyama et al. |
| 2007/0192735 A1 | 8/2007 | Lehto et al. |
| 2007/0207750 A1 | 9/2007 | Brown et al. |
| 2007/0223398 A1 | 9/2007 | Luo et al. |
| 2007/0225831 A1 | 9/2007 | Sakurada |
| 2007/0248179 A1 | 10/2007 | Hassan et al. |
| 2007/0254628 A1 | 11/2007 | Rybak |
| 2007/0271525 A1 | 11/2007 | Han et al. |
| 2007/0274488 A1 | 11/2007 | Callaghan |
| 2007/0280332 A1 | 12/2007 | Srikanteswara et al. |
| 2007/0280481 A1 | 12/2007 | Eastlake et al. |
| 2008/0002658 A1 | 1/2008 | Soliman |
| 2008/0016338 A1 | 1/2008 | Sun |
| 2008/0031155 A1 | 2/2008 | Korus et al. |
| 2008/0055399 A1 | 3/2008 | Woodworth et al. |
| 2008/0055423 A1 | 3/2008 | Ying et al. |
| 2008/0063204 A1 | 3/2008 | Braskich et al. |
| 2008/0065238 A1 | 3/2008 | Igoe |
| 2008/0081597 A1 | 4/2008 | Cole |
| 2008/0104170 A1 | 5/2008 | Ananthanarayanan |
| 2008/0130519 A1 | 6/2008 | Bahl et al. |
| 2008/0130639 A1 | 6/2008 | Costa-Requena et al. |
| 2008/0132201 A1 | 6/2008 | Karlberg |
| 2008/0152098 A1 | 6/2008 | Paryzek et al. |
| 2008/0195861 A1 | 8/2008 | Salomone |
| 2008/0197802 A1 | 8/2008 | Onishi et al. |
| 2008/0207119 A1 | 8/2008 | Chang |
| 2008/0207128 A1 | 8/2008 | Mikko |
| 2008/0227384 A1 | 9/2008 | Placzek et al. |
| 2008/0252419 A1 | 10/2008 | Batchelor et al. |
| 2008/0275993 A1 | 11/2008 | Mohammed et al. |
| 2008/0293375 A1 | 11/2008 | Swanburg |
| 2008/0293419 A1 | 11/2008 | Somasundaram et al. |
| 2008/0311952 A1 | 12/2008 | Sugiyama |
| 2008/0319857 A1 | 12/2008 | Dobbins et al. |
| 2009/0011738 A1 | 1/2009 | Sasakura |
| 2009/0013175 A1 | 1/2009 | Elliott |
| 2009/0039828 A1 | 2/2009 | Jakubowski |
| 2009/0045913 A1 | 2/2009 | Nelson et al. |
| 2009/0055266 A1 | 2/2009 | Brody et al. |
| 2009/0089885 A1 | 4/2009 | Noble et al. |
| 2009/0092060 A1 | 4/2009 | Goto |
| 2009/0100080 A1 | 4/2009 | Toms et al. |
| 2009/0103481 A1 | 4/2009 | Mahajan et al. |
| 2009/0106542 A1 | 4/2009 | Dubs et al. |
| 2009/0111378 A1 | 4/2009 | Sheynman et al. |
| 2009/0138715 A1 | 5/2009 | Xiao et al. |
| 2009/0144622 A1 | 6/2009 | Evans et al. |
| 2009/0154343 A1 | 6/2009 | Fitch et al. |
| 2009/0158394 A1 | 6/2009 | Oh et al. |
| 2009/0170431 A1 | 7/2009 | Pering et al. |
| 2009/0196180 A1 | 8/2009 | Bahl et al. |
| 2009/0210940 A1 | 8/2009 | Dean |
| 2009/0249322 A1 | 10/2009 | Sugiyama et al. |
| 2009/0254924 A1 | 10/2009 | Anirudh et al. |
| 2009/0303902 A1 | 12/2009 | Liu et al. |
| 2009/0303921 A1 | 12/2009 | Manchanda et al. |
| 2009/0319663 A1 | 12/2009 | Giles et al. |
| 2010/0049971 A1 | 2/2010 | Oh |
| 2010/0056124 A1 | 3/2010 | Keating et al. |
| 2010/0081473 A1 | 4/2010 | Chatterjee et al. |
| 2010/0091965 A1 | 4/2010 | Ma et al. |
| 2010/0100637 A1 | 4/2010 | Bowra et al. |
| 2010/0103850 A1 | 4/2010 | Gossain et al. |
| 2010/0104078 A1 | 4/2010 | Henry, Jr. et al. |
| 2010/0110890 A1 | 5/2010 | Rainer et al. |
| 2010/0111033 A1 | 5/2010 | Erceg et al. |
| 2010/0115278 A1 | 5/2010 | Shen et al. |
| 2010/0121744 A1 | 5/2010 | Belz et al. |
| 2010/0123598 A1 | 5/2010 | Brodersen et al. |
| 2010/0123834 A1 | 5/2010 | Brodersen et al. |
| 2010/0144274 A1 | 6/2010 | Mcdowall et al. |
| 2010/0153762 A1 | 6/2010 | Radulescu et al. |
| 2010/0157167 A1 | 6/2010 | Lawther et al. |
| 2010/0175101 A1 | 7/2010 | Devictor et al. |
| 2010/0186066 A1 | 7/2010 | Pollard |
| 2010/0191576 A1 | 7/2010 | Raleigh |
| 2010/0191847 A1 | 7/2010 | Raleigh |
| 2010/0195580 A1 | 8/2010 | Samarasooriya et al. |
| 2010/0198952 A1 | 8/2010 | Kneckt et al. |
| 2010/0220856 A1 | 9/2010 | Kruys et al. |
| 2010/0226253 A1 | 9/2010 | Bugenhagen |
| 2010/0232332 A1 | 9/2010 | Abdel-Kader |
| 2010/0248599 A1 | 9/2010 | Voigt et al. |
| 2010/0257251 A1 | 10/2010 | Mooring et al. |
| 2010/0284316 A1 | 11/2010 | Sampathkumar |
| 2010/0302005 A1 | 12/2010 | Popovski |
| 2010/0333032 A1 | 12/2010 | Lau et al. |
| 2011/0010433 A1 | 1/2011 | Wilburn et al. |
| 2011/0107388 A1 | 5/2011 | Lee et al. |
| 2011/0145581 A1 | 6/2011 | Malhotra et al. |
| 2011/0149806 A1 | 6/2011 | Verma et al. |
| 2011/0176463 A1 | 7/2011 | Cowan et al. |
| 2011/0188391 A1 | 8/2011 | Sella et al. |
| 2011/0188419 A1 | 8/2011 | Filoso et al. |
| 2011/0188420 A1 | 8/2011 | Filoso et al. |
| 2011/0202189 A1 | 8/2011 | Venkatakrishnan et al. |
| 2011/0230209 A1 | 9/2011 | Kilian |
| 2011/0238498 A1 | 9/2011 | Hassan et al. |
| 2011/0261001 A1 | 10/2011 | Liu |
| 2011/0274020 A1 | 11/2011 | Filoso et al. |
| 2011/0275316 A1 | 11/2011 | Suumaeki et al. |
| 2011/0280413 A1 | 11/2011 | Wu et al. |
| 2011/0293095 A1 | 12/2011 | Ben Ayed |
| 2011/0320963 A1 | 12/2011 | Wong |
| 2011/0321126 A1 | 12/2011 | Maniatopoulos |
| 2012/0101952 A1 | 4/2012 | Raleigh et al. |
| 2012/0139690 A1 | 6/2012 | Gupta et al. |
| 2012/0144083 A1 | 6/2012 | Hassan et al. |
| 2012/0147268 A1 | 6/2012 | Hassan et al. |
| 2012/0147274 A1 | 6/2012 | Hassan et al. |
| 2012/0147825 A1 | 6/2012 | Hassan et al. |
| 2012/0155643 A1 | 6/2012 | Hassan et al. |
| 2012/0157038 A1 | 6/2012 | Menezes et al. |
| 2012/0158839 A1 | 6/2012 | Hassan et al. |
| 2012/0158947 A1 | 6/2012 | Hassan et al. |
| 2012/0158981 A1 | 6/2012 | Desai et al. |
| 2012/0178429 A1 | 7/2012 | Camps Mur et al. |
| 2012/0197792 A1 | 8/2012 | Raleigh |
| 2013/0033800 A1 | 2/2013 | Bartnik et al. |
| 2013/0097422 A1 | 4/2013 | Salomone |
| 2013/0182614 A1 | 7/2013 | Kumar et al. |

(56) References Cited

U.S. PATENT DOCUMENTS

| | | | |
|---|---|---|---|
| 2013/0211893 A1 | 8/2013 | Bryant et al. |
| 2013/0322846 A1 | 12/2013 | Ferren et al. |
| 2014/0328251 A1 | 11/2014 | Hassan et al. |

FOREIGN PATENT DOCUMENTS

| | | | |
|---|---|---|---|
| CN | 1607780 | A | 4/2005 |
| CN | 1677975 | A | 10/2005 |
| CN | 1929424 | A | 3/2007 |
| CN | 1960474 | A | 5/2007 |
| CN | 101021774 | A | 8/2007 |
| CN | 101044718 | A | 9/2007 |
| CN | 101075820 | A | 11/2007 |
| CN | 101094140 | A | 12/2007 |
| CN | 101137960 | A | 3/2008 |
| CN | 101147308 | A | 3/2008 |
| CN | 101179359 | A | 5/2008 |
| CN | 101288063 | A | 10/2008 |
| CN | 101657828 | A | 2/2010 |
| CN | 1662920 | B | 4/2010 |
| CN | 101841637 | A | 9/2010 |
| CN | 101867623 | A | 10/2010 |
| EP | 2256663 | A | 12/2010 |
| GB | 2418809 | A | 4/2006 |
| JP | 2001160927 | A | 6/2001 |
| JP | 2005004089 | A | 1/2005 |
| JP | 2005295286 | A | 10/2005 |
| JP | 2005341094 | A | 12/2005 |
| JP | 2006050216 | A | 2/2006 |
| JP | 2007527156 | A | 9/2007 |
| KR | 2008032979 | A | 4/2008 |
| KR | 20100038089 | A | 4/2010 |
| WO | 0147248 | A | 6/2001 |
| WO | 0154342 | A | 7/2001 |
| WO | 2004003801 | A1 | 1/2004 |
| WO | 2006131077 | A1 | 12/2006 |
| WO | 2008021855 | A | 2/2008 |
| WO | 2008089854 | A | 7/2008 |
| WO | 2008127507 | A | 10/2008 |
| WO | 2009046869 | A | 4/2009 |
| WO | 2010044599 | A | 4/2010 |
| WO | 2010132296 | A1 | 11/2010 |

OTHER PUBLICATIONS

"International Search Report", Mailed Date: Jul. 12, 2012, Application No. PCT/US2011/063207, Filing Date: Dec. 4, 2011, pp. 9.
"International Search Report", Mailed Date: Jun. 22, 2012, Application No. PCT/US2011/063340, Filed Date: Dec. 5, 2011, pp. 9.
"Notice of Allowance Issued in Chinese Patent Application No. 201110423031.4", Mailed Date: Jan. 23, 2015, 3 Pages.
"Notice of Allowance Issued in U.S. Appl. No. 12/970,069" Mailed Date: Dec. 8, 2015, 3 Pages.
"Notice of Allowance Issued in U.S. Appl. No. 12/970,069" Mailed Date: Nov. 12, 2015, 3 Pages.
"Notice of Allowance Issued in U.S. Appl. No. 12/970,069", Mailed Date: Jan. 29, 2016, 4 Pages.
"Notice of Allowance Issued in U.S. Appl. No. 12/970,069", Mailed Date: May 15, 2015, 4 Pages.
"Office Action and Search Report Issued in Chinese Patent Application No. 201110400472.2", Mailed Date: Oct. 27, 2014, 14 Pages.
"Office Action Received in Australia Patent Application No. 2011343700", Mailed Date: Jul. 24, 2015, 2 Pages.
"Omnidrive", 2006, retrieved Oct. 26, 2006, 2 pages.
"Xdrive", 2006, retrieved Oct. 26, 2006, 2 pages.
"Second Office Action Issued in Chinese Patent Application No. 201110408217.2", Mailed Date: May 23, 2014, Filed Date: Dec. 9, 2011, 8 Pages including partial translation.
02 Network Scraps Unlimited Data for Smartphones; Published Date: Jun. 10, 2010; 2 pages.
802.11 Fast BSS Transition (FT) Part 1 of 2; Published Date: Aug. 21, 2007, 5 pages.
A New Location Technique for the Active Office—Published Date: 1997, http://citeseerx.ist.nsu.edu/viewdoc/download?doi=10.1.1. 20.5052&rep=repl&type=pdf.
Advisory Action mailed Jan. 2, 2013 in U.S. Appl. No. 11/726,862, 3 pages.
Araujo, Joao Taveira et al., "Towards Cost-Aware Multipath Routing," AIMS 2009, LNCS 5637, 2009, pp. 207-210.
Butler, Kevin R.B. et al.; Leveraging Identity-Based Cryptography for Node ID Assignment in Structured P2P Systems; IEEE Transactions on Parallel and Distributed Systems; vol. 20, No. 12; Dec. 2009; pp. 1803-1815.
Chinese Office Action dispatched Dec. 4, 2013 in CN Patent Application No. 201110426187.8, 8 pages including Concise Explanation of Relevance and/or partial translation.
Chinese Office Action dispatched Feb. 28, 2014 in CN Patent Application No. 201110426179.3, 9 pages including Concise Explanation of Relevance and/or partial translation.
Chinese Office Action mailed Jan. 6, 2014 in CN Patent App. No. 201110423068.7, 8 pages including concise explanation of relevance and partial translation.
Chinese Office Action mailed Jan. 7, 2015 in CN Patent App. No. 201110400433.2, 10 pages including partial translation.
Chinese Office Action mailed Nov. 20, 2013 in CN Patent App. No. 201110423001.3, 18 pages including translation.
Chinese Office Action mailed Dec. 4, 2013 in CN Patent App. No. 201110408217.2, 12 pages, including Concise Explanation of Relevance and/or partial translation.
Chinese Office Action mailed Dec. 4, 2013 in CN Patent App. No. 201110423031.4, 26 pages including translation.
Chinese Office Action mailed Feb. 17, 2014 in CN Patent App. No. 201110400433.2, 12 pages including partial translation.
Chinese Office Action mailed Feb. 27, 2014 in CN Patent App. No. 201110400472.2, 13 pages including Concise Explanation of Relevance and partial translation.
Chinese Office Action mailed Jul. 11, 2014 in CN Patent App. No. 201110423031.4, 13 pages, including partial translation and/or concise explanation of relevance.
Chinese Office Action mailed Jul. 13, 2015 in CN Patent App. No. 201110400433.2, 3 pages.
Chinese Office Action mailed Aug. 5, 2014 in CN Patent App. No. 201110426179.3, 6 pages, Including partial translation.
Chinese Office Action mailed Sep. 2, 2014 in CN Patent App. No. 201110408217.2, 6 pages, including partial translation.
Chinese Office Action mailed Sep. 4, 2014 in CN Patent App. No. 201110423001.3, 6 pages, including partial translation.
Chinese Office Action mailed Sep. 9, 2014 in CN Patent App. No. 201110400433.2, 13 pages including partial translation.
Choi, Jongmyung., "RFID Context-aware Systems", In Proceedings of Sustainable Radio Frequency Identification Solutions, Feb. 1, 2010, pp. 307-331.
Cisco Systems, Inc., "802.11 n Wireless Technology Overview," 2007, 7 pages.
Creating Customized Web Experiences with Windows Media Player 9 Series; Published Date: Nov. 2002; 4 pages.
CRTDH; An Efficient Key Agreement Scheme for Secure Group Communications in Wireless Ad Hoc Networks; Published Date: 2005, 5 pages.
Currie, et al., "Experimental Evaluation of Read Performance for RFID-based Mobile Sensor Data Gathering Applications", In Proceedings of the 7th International Conference on Mobile and Ubiquitous Multimedia, Dec. 3, 2008, pp. 92-95.
Desai, Mitesh, K; "Fast Join of Peer to Peer Group With Power Saving Mode"; U.S. Appl. No. 14/975,818, filed Dec. 20, 2015; 56 pages including Preliminary Amendment filed Dec. 29, 2015.
Extended European Search Report dated May 20, 2014 in EP Patent App. No. 11847426.1, 8 pages.
Extended European Search Report dated Jun. 8, 2015 in EP Patent App. No. 11849551.4, 6 pages.
Final Office Action mailed Jan. 11, 2016 in U.S. Appl. No. 12/970,034, 25 pages.
Final Office Action mailed Jan. 16, 2015 in U.S. Appl. No. 12/960,753, 12 pages.

(56) References Cited

OTHER PUBLICATIONS

Final Office Action mailed Jan. 28, 2015 in U.S. Appl. No. 12/970,034, 24 pages.
Final Office Action mailed Jan. 9, 2015 in U.S. Appl. No. 14/318,380, 8 pages.
Final Office Action mailed Oct. 25, 2013 in U.S. Appl. No. 12/972,104, 10 pages.
Final Office Action mailed Oct. 6, 2014 in U.S. Appl. No. 12/972,104, 10 pages.
Final Office Action mailed Nov. 13, 2012 in U.S. Appl. No. 12/748,829, 42 pages.
Final Office Action mailed Nov. 15, 2010 in U.S. Appl. No. 11/726,862, 21 pages.
Notice of Allowance mailed Jun. 24, 2015 in U.S. Appl. No. 14/458,203, 11 pages.
Notice of Allowance mailed Jun. 27, 2014 in U.S. Appl. No. 12/970,159, 8 pages.
Notice of Allowance mailed Jun. 28, 2016 in JP Patent Application No. 2013-544795, 3 pages.
Notice of Allowance mailed Jun. 8, 2015 in U.S. Appl. No. 13/772,275, 8 pages.
Notice of Allowance mailed Jul. 12, 2013 in U.S. Appl. No. 12/967,761, 12 pages.
Notice of Allowance mailed Jul. 24, 2014 in U.S. Appl. No. 12/972,230, 7 pages.
Notice of Allowance mailed Aug. 20, 2014 in U.S. Appl. No. 12/964,492, 13 pages.
Notice of Allowance mailed Sep. 17, 2014 in U.S. Appl. No. 12/972,230, 7 pages.
Notice of Allowance mailed Sep. 3, 2014 in U.S. Appl. No. 12/970,159, 9 pages.
Office Action dated Oct. 26, 2015 in JP Pat. App. No. 2013-543239, 13 pages including translation.
Office Action dated Nov. 16, 2015 in JP Pat. App. No. 2013-544795, 9 pages.
Office Action dated Nov. 24, 2015 in RU Pat. App. No. 2013127235, 4 Pages w/o English Translation.
Office Action dated Apr. 13, 2015 in CN Pat. App. No. 201110400472.04, 14 pages, including partial translation and/or concise explanation of relevance.
Office Action dated Aug. 13, 2015 in AU Pat. App. No. 2011343943, 5 pages.
Office Action dated Aug. 28, 2015 in JP Pat. App. No. 2013-544714, 5 pages including translation.
Office Action dated Apr. 1, 2014 in CN Pat. App. No. 201110423001.3, 8 pages, including partial translation.
Office Action dated Apr. 3, 2014 in CN Pat. App. No. 201110417153.2, 15 pages, including partial translation and/or concise explanation of relevance.
Office Action dated Aug. 14, 2015 in CN Pat. App. No. 201110417226.8, 6 pages, including partial translation.
Office Action dated Dec. 15, 2014 in CN Pat. App. No. 201110417153.2, 8 pages, including partial translation.
Office Action dated Feb. 3, 2015 in CN Pat. App. No. 201110417226.8, 7 pages, including partial translation and/or concise explanation of relevance.
Office Action dated Jun. 5, 2014 in CN Pat. App. No. 201110417226.8, 14 pages, including partial translation and/or concise explanation of relevance.
Pawar, Pravin et al. "Towards Location based QoS-Aware Network Selection Mechanism for the Nomadic Mobile Services," Dec. 5, 2009, 5 pages.
Roduner, et al., "Operating Appliances with Mobile Phones—Strengths and Limits of a Universal Interaction Device", In Proceedings of the 5th international conference on Pervasive computing, May 13, 2007, 18 pages.
Shared Spectrum, Inc., "Our Technology," Nov. 2010, 2 pages.
Shin, Eugene et al.; Wake on Wireless: An Event Driven Energy Saving; Published Date: Sep. 23-26, 2002; 12 pages.
Sridhar, T.; Wi-Fi, Bluetooth and WiMAX; The Internet Protocol Journal, vol. 11, No. 4; Retrieved Date: Sep. 30, 2010, 9 pages.
Subscription Management; Copyright 2009; Retrieved Date: Jan. 12, 2010; 2 pages.
Symbian Foundation Peer-to-Peer WiFi Inititative (WiFi Direct); Published Date: Sep. 10, 2010, 11 pages.
Texas Instruments, MSP430 Ultra-Low-Power MCUs and Ti-RFid Devices, 2 pages, 2009.
T-mobile "Unlimited" Data Usage; Published Date: Mar. 9, 2010; 6 pages.
Torres Service Management Platform; Retrieved Date: Jan. 12, 2010; 2 pages.
VAS Subscription Manager; Retrieved Date: Jan. 12, 2010; 1 page.
Wi-Fi Alliance: FAQs; Published Date: 2010; 19 pages.
Wi-Fi Certified Wi-Fi Direct, Personal, Portable Wi-Fi Technology; Oct. 2010, 14 pages.
WinLIRC; Published Date: Mar. 17, 2008; 5 pages.
Wireless PC to TV; Retrieved Date: Sep. 9, 2010; 2 pages.
Wood, "Kowari: A Platform for Semantic Web Storage and Analysis", May 27, 2005, 16 pages.
Yuan, Y. et al., "Allocating Dynamic Time-Spectrum Blocks in Cognitive Radio Networks," Sep. 9-14, 2007, 10 pages.
Final Office Action mailed Dec. 26, 2013 in U.S. Appl. No. 12/967,638, 34 pages.
Final Office Action mailed Dec. 4, 2014 in U.S. Appl. No. 12/960,730, 22 pages.
Final Office Action mailed Dec. 5, 2014 in U.S. Appl. No. 12/970,069, 21 pages.
Final Office Action mailed Feb. 11, 2014 in U.S. Appl. No. 12/970,069, 26 pages.
Final Office Action mailed Feb. 15, 2013 in U.S. Appl. No. 12/967,761, 28 pages.
Final Office Action mailed Feb. 15, 2013 in U.S. Appl. No. 12/970,069, 23 pages.
Final Office Action mailed Mar. 11, 2016 in U.S. Appl. No. 12/960,753, 17 pages.
Final Office Action mailed Mar. 28, 2013 in U.S. Appl. No. 12/967,638, 22 pages.
Final Office Action mailed Jun. 9, 2016 in U.S. Appl. No. 14/600,477, 9 pages.
Final Office Action mailed Jul. 12, 2016 in U.S. Appl. No. 14/981,271, 10 pages.
Final Office Action mailed Jul. 13, 2015 in U.S. Appl. No. 14/318,380, 8 pages.
Final Office Action mailed Sep. 15, 2011 in U.S. Appl. No. 11/726,862, 24 pages.
Final Office Action mailed Sep. 20, 2012 in U.S. Appl. No. 11/726,862, 35 pages.
Final Office Action mailed Sep. 23, 2013 in U.S. Appl. No. 12/970,034, 22 pages.
Guide to IEEE 802.11i: Establishing Robust Security Networks;Published Date: Jun. 2006; 155 pages.
Haas, Robert et al., "Cost-and Quality-of-Service-Aware Network-Service Deployment," 2001, 6 pages.
Hassan, Amer, "Cognitive Use of Multiple Regulatory Domains"; U.S. Appl. No. 14/458,203, filed Aug. 12, 2014; 58 pages including Preliminary Amendment filed Oct. 9, 2014.
Hassan, Amer, "Cognitive Use of Multiple Regulatory Domains"; U.S. Appl. No. 14/863,290, filed Sep. 23, 2015; 57 pages including Preliminary Amendment filed Nov. 1, 2015.
Hassan, Amer, "Direct Connection With Side Channel Control"; U.S. Appl. No. 14/333,386, filed Jul. 16, 2014; 65 pages including Preliminary Amendment filed Sep. 26, 2014.
Hassan, Amer, "Direct Connection With Side Channel Control"; U.S. Appl. No. 14/993,786, filed Jan. 12, 2016; 64 pages including Preliminary Amendment filed Jan. 13, 2016.
Hassan, Amer, "Secure Protocol for Peer-To-Peer Network"; U.S. Appl. No. 14/600,477, filed Jan. 20, 2015; 62 pages including Preliminary Amendment filed May 8, 2014.
How Do You Use a Laptop As a TV Remote Control?; Published Date: Jul. 15, 2008; 6 pages.
International Search Report mailed Jul. 24, 2012 in PCT Application No. PCT/US2011/065691, Filing Date: Dec. 17, 2011, 11 pages.

(56) References Cited

OTHER PUBLICATIONS

International Search Report mailed Sep. 5, 2012 in PCT Application No. PCT/US2011/065692, Filing Date: Dec. 17, 2011, 8 pages.
International Search Report; Mailed Date: Aug. 31, 2012; Application No. PCT/US2011/064753; Filed Date: Dec. 14, 2011, pp. 8.
International Search Report; Mailed Date: Jul. 31, 2012; Application No. PCT/US2011/065285; Filed Date: Dec. 15, 2011, pp. 9.
Kaasinen, et al., "Ambient Functionality—Use Cases", In Proceedings of the 2005 joint conference on Smart objects and ambient intelligence: innovative context-aware services: usages and technologies, Oct. 12, 2005, 6 pages.
Kitson, Fred., "Mobile Media Making it a Reality", In Proceedings of Mobile Computing, vol. 3, Issue 4, Jun. 7, 2005, 17 pages.
Klym, et al., "The Evolution of RFID Networks: The Potential for Disruptive Innovation", In White Paper, Mar. 2006, 20 pages.
Lun, Desmond S. et al., "Network Coding with a Cost Criterion," MIT LIDS Technical Report P-2584, Apr. 2004, 18 pages.
Manage Subscription Products & Automate Recurring Billing Operations; Copyright 2008-2009; Retrieved Date: Jan. 12, 2010, 1 page.
Manifest Permission; Published Date: Jul. 21, 2004; 19 pages.
Meinrath et al.; "Unlicensed 'White Space Device' Operations on the TV Band and the Myth of Harmful Interferences", Mar. 2008, 13 pages.
Meinrath et al.; "White Space Devices" & The Myths of Harmful Interference, 11 N.Y.U.J. Legis&Pub. Policy 495, 2008, 24 pages.
Menezes, Pascal; "Operating System Supporting Cost Aware Applications"; U.S. Appl. No. 13/844,932, filed Mar. 16, 2013, 57 pages.
Menezes, Pascal; "Operating System Supporting Cost Aware Applications"; U.S. Appl. No. 14/318,380, filed Mar. 16, 2013; 56 pages.
Menezes, Pascal; "Operating System Supporting Cost Aware Applications"; U.S. Appl. No. 14/981,271, filed Dec. 28, 2016; 63 pages including Preliminary Amendment filed Jan. 20, 2016.
Menezes, Pascal; "Operating System Supporting Cost Aware Applications"; U.S. Appl. No. 15/098,321, filed Apr. 14, 2016; 57 pages.
MIST: Cellular Data Network Measurement for Mobile Applications; Published Date: Apr. 24, 2006; 9 pages.
Mobile Internet Usage Measurements—Case Finland; Published Date: Apr. 24, 2006; 140 pages.
Mohammed, "Web Service for User and Subscription Data Storage", U.S. Appl. No. 13/772,275, filed Feb. 20, 2013, 49 pages.
Motorola, "TV White Space Position Paper," 2008, 10 pages.
Non-Final Office Action mailed Jan. 21, 2016 in U.S. Appl. No. 14/863,290, 7 pages.
Non-Final Office Action mailed Jan. 4, 2013 in U.S. Appl. No. 12/960,730, 14 pages.
Non-Final Office Action mailed Oct. 2, 2012 in U.S. Appl. No. 12/967,638, 33 pages.
Non-Final Office Action mailed Oct. 16, 2012 in U.S. Appl. No. 12/970,069, 23 pages.
Non-Final Office Action mailed Oct. 2, 2014 in U.S. Appl. No. 14/318,380, 5 pages.
Non-Final Office Action mailed Oct. 26, 2012 in U.S. Appl. No. 12/967,761, 24 pages.
Non-Final Office Action mailed Oct. 27, 2014 in U.S. Appl. No. 13/772,275, 14 pages.
Non-Final Office Action mailed Nov. 6, 2013 in U.S. Appl. No. 12/960,730, 16 pages.
Non-Final Office Action mailed Nov. 8, 2013 in U.S. Appl. No. 13/844,932, 6 pages.
Non-Final Office Action mailed Feb. 1, 2016 in U.S. Appl. No. 14/981,271, 8 pages.
Non-Final Office Action mailed Feb. 26, 2016 in U.S. Appl. No. 14/600,477, 10 pages.
Non-Final Office Action mailed Feb. 28, 2014 in U.S. Appl. No. 12/970,159, 22 pages.
Non-Final Office Action mailed Mar. 31, 2015 in U.S. Appl. No. 14/318,380, 7 pages.
Non-Final Office Action mailed Apr. 11, 2013 in U.S. Appl. No. 12/972,104, 15 pages.
Non-Final Office Action mailed Apr. 14, 2011 in U.S. Appl. No. 11/726,862, 22 pages.
Non-Final Office Action mailed Apr. 23, 2015 in U.S. Appl. No. 14/458,203, 10 pages.
Non-Final Office Action mailed Apr. 5, 2012 in U.S. Appl. No. 11/726,862, 23 pages.
Non-Final Office Action mailed May 23, 2014 in U.S. Appl. No. 12/748,829, 30 pages.
Non-Final Office Action mailed May 23, 2014 in U.S. Appl. No. 12/960,730, 18 pages.
Non-Final Office Action mailed May 30, 2013 in U.S. Appl. No. 12/970,034, 22 pages.
Non-Final Office Action mailed Jun. 10, 2015 in U.S. Appl. No. 12/972,104, 10 pages.
Non-Final Office Action mailed Jun. 18, 2014 in U.S. Appl. No. 12/960,753, 12 pages.
Non-Final Office Action mailed Jun. 20, 2014 in U.S. Appl. No. 12/972,104, 10 pages.
Non-Final Office Action mailed Jun. 23, 2010 in U.S. Appl. No. 11/726,862, 16 pages.
Non-Final Office Action mailed Jun. 30, 2015 in U.S. Appl. No. 12/970,034, 26 pages.
Non-Final Office Action mailed Jun. 9, 2014 in U.S. Appl. No. 12/970,069, 20 pages.
Non-Final Office Action mailed Jul. 18, 2014 in U.S. Appl. No. 12/970,034, 24 pages.
Non-Final Office Action mailed Jul. 29, 2016 in U.S. Appl. No. 14/993,786, 16 pages.
Non-Final Office Action mailed Aug. 14, 2015 in U.S. Appl. No. 12/960,753, 16 pages.
Non-Final Office Action mailed Aug. 14, 2013 in U.S. Appl. No. 12/967,638, 30 pages.
Non-Final Office Action mailed Aug. 16, 2013 in U.S. Appl. No. 12/970,069, 26 pages.
Non-Final Office Action mailed Aug. 5, 2014 in U.S. Appl. No. 13/844,932, 7 pages.
Non-Final Office Action mailed Aug. 9, 2012 in U.S. Appl. No. 12/748,829, 29 pages.
Non-Final Office Action mailed Sep. 24, 2012 in U.S. Appl. No. 12/964,492, 10 pages.
Non-Final Office Action mailed Sep. 29, 2014 in U.S. Appl. No. 12/748,829, 30 pages.
Non-Final Office Action mailed Sep. 4, 2015 in U.S. Appl. No. 14/318,380, 6 pages.
Non-Final Office Action mailed Sep. 6, 2012 in U.S. Appl. No. 12/972,230, 10 pages.
Notice of Acceptance dated Oct. 16, 2015 in AU Pat. App. No. 2011343943, 2 pages.
Notice of Allowance dated May 24, 2016 in JP Pat. App. No. 2013-544714, 3 pages.
Notice of Allowance dated Jul. 1, 2016 in RU Pat. App. No. 2013127235, 12 Pages w/o English Translation.
Notice of Allowance mailed Jan. 7, 2016 in U.S. Appl. No. 14/318,380, 8 pages.
Notice of Allowance mailed Oct. 19, 2015 in U.S. Appl. No. 13/772,275, 8 pages.
Notice of Allowance mailed Oct. 28, 2015 in U.S. Appl. No. 14/333,386, 12 pages.
Notice of Allowance mailed Oct. 8, 2015 in U.S. Appl. No. 12/970,069, 9 pages.
Notice of Allowance mailed Nov. 12, 2014 in U.S. Appl. No. 13/844,932, 8 pages.
Notice of Allowance mailed Nov. 20, 2012 in U.S. Appl. No. 12/972,230, 9 pages.
Notice of Allowance mailed Dec. 26, 2013 in U.S. Appl. No. 12/972,230, 8 pages.
Notice of Allowance mailed Feb. 19, 2014 in U.S. Appl. No. 13/844,932, 8 pages.
Notice of Allowance mailed Mar. 10, 2014 in U.S. Appl. No. 12/972,230, 8 pages.
Notice of Allowance mailed Mar. 20, 2013 in U.S. Appl. No. 12/964,492, 9 pages.

(56) References Cited

OTHER PUBLICATIONS

Notice of Allowance mailed Mar. 20, 2015 in U.S. Appl. No. 12/970,069, 11 pages.
Notice of Allowance mailed Mar. 25, 2013 in U.S. Appl. No. 12/972,230, 8 pages.
Notice of Allowance mailed Mar. 4, 2013 in U.S. Appl. No. 12/972,230, 7 pages.
Notice of Allowance mailed Mar. 6, 2014 in U.S. Appl. No. 12/967,638, 11 pages.
Notice of Allowance mailed Apr. 2, 2014 in U.S. Appl. No. 12/964,492, 9 pages.
Notice of Allowance mailed May 23, 2016 in U.S. Appl. No. 14/863,290, 12 pages.
Notice of Allowance mailed May 24, 2016 in JP Patent Application No. 2013-544714, 4 pages.
Notice of Allowance mailed May 7, 2014 in U.S. Appl. No. 13/844,932, 7 pages.
"International Preliminary Report on Patentability Issued in PCT Application No. PCT/US11/65691", Mailed Date: Jun. 18, 2013, 5 Pages.
"Notice of Allowance Issued in Chinese Patent Application No. 201110426179.3", Mailed Date: Nov. 4, 2014, 3 Pages.
Non-Final Office Action mailed Aug. 18, 2016 in U.S. Appl. No. 12/972,104, 13 pages.
Notice of Allowance dated Sep. 2, 2016 in U.S. Appl. No. 12/960,753, 9 pages.
Notice of Allowance mailed Oct. 27, 2016 in U.S. Appl. No. 14/600,477, 8 pages.
Non-Final Office Action mailed Dec. 7, 2016 in U.S. Appl. No. 14/981,271, 5 pages.
Hassan, Amer, "Universal Dock for Context Sensitive Computing Device"; U.S. Appl. No. 15/399,728, filed Jan. 5, 2017, including Preliminary Amendment filed Jan. 19, 2017; 50 pages.
Hassan, Amer, "Secure Protocol for Peer-To-Peer Network"; U.S. Appl. No. 15/409,383, filed Jan. 18, 2017; 61 pages including Preliminary Amendment filed Feb. 2, 2017.
Non-Final Office Action mailed Feb. 8, 2017 in U.S. Appl. No. 15/399,728, 11 pages.
Final Office Action mailed Feb. 10, 2017 in U.S. Appl. No. 14/993,786, 14 pages.
Examiner's Answer mailed Dec. 27, 2016 in U.S. App. No. 12/970,034, 4 pages.
European Office Action dated Feb. 13, 2017 in EP Patent App. No. 11847426.1, 7 pages.
Non-Final Office Action mailed Apr. 14, 2017 in U.S. Appl. No. 15/098,321, 16 pages.
Notice of Allowance mailed May 18, 2017 in U.S. Appl. No. 15/399,728, 7 pages.
Final Office Action mailed Feb. 2, 2017 in U.S. Appl. No. 12/972,104, 16 pages.
Final Office Action dated Jun. 20, 2016 in U.S. Appl. No. 14/981,271, 9 pages.
Notice of Allowance dated Jun. 23, 2017 in U.S. Appl. No. 14/993,786, 9 pages.
"Supplementary Search Report Issued in European Patent Application No. 11848261.1", dated May 24, 2017, 8 Pages.
Non-Final Office Action dated Aug. 1, 2017 in U.S. Appl. No. 15/409,383, 11 pages.

* cited by examiner

US 9,801,074 B2

COGNITIVE USE OF MULTIPLE REGULATORY DOMAINS

CROSS-REFERENCE TO RELATED APPLICATION(S)

This application is a continuation of U.S. patent application Ser. No. 14/863,290, filed Sep. 23, 2015, entitled "COGNITIVE USE OF MULTIPLE REGULATORY DOMAINS," which continuation of U.S. patent application Ser. No. 14/458,203, filed Aug. 12, 2014, entitled "COGNITIVE USE OF MULTIPLE REGULATORY DOMAINS," now U.S. Pat. No. 9,178,652, issued Nov. 3, 2015, which is a continuation of U.S. patent application Ser. No. 12/964,492, filed Dec. 9, 2010, entitled "COGNITIVE USE OF MULTIPLE REGULATORY DOMAINS," now U.S. Pat. No. 8,923,770, issued Dec. 31, 2014. The entirety of each of these afore-mentioned applications is incorporated herein by reference.

BACKGROUND

There are many instances in today's information age in which information is communicated wirelessly. Computing devices widely are equipped with radios for the wireless exchange of information with other computing devices. Wireless communication enables a wide range of functionalities to be available through a computing device, without a requirement that the computing device be physically connected to those computing devices or even to a network through which those computing devices can be reached. Rather, mobile computing devices are known to be wirelessly connected to a network, such as the Internet, through which information can be exchanged with other computing devices. Computing devices may also be directly connected to each other or to peripheral devices, such as printers and display devices, through wireless connections. Even for devices that are primarily intended for use in a single location, a wireless connection may be provided to avoid the need to route wires in that location.

In addition, wireless communication is used for purposes beyond interconnecting computing devices. Wireless communication allows audio and video content to be broadcast to multiple receivers. For instance, television signals are often communicated wirelessly. Similarly, audio radio stations also broadcast signals wirelessly. Moreover, wireless communications play an important role in military and public safety related communications. As yet a further example, wireless communication also enables mobile phone services.

To avoid interference between many entities trying to communicate wirelessly, multiple techniques may be used. One technique separates users by frequency such that transmissions by users are made at different frequencies. A device may have a radio tuned to receive communications having a particular frequency characteristic, while excluding other communications.

To accommodate the many entities that desire to use wireless communication, the available frequency spectrum that is usable for wireless communication is divided into domains. These domains are established by government regulators such that different frequencies may be used for different purposes in different countries. However, in all countries it is generally the case that regulations establishing a domain define who is permitted to use the domain and the purposes for which the corresponding frequency band can be used. For example, in the United States, a domain is established for transmission of digital television signals. A separate domain has been established for Industrial, Scientific and Medical (ISM) radios and another domain. Another domain, called the Unlicensed National Information Infrastructure (UNIT) domain, is used for wireless communication in accordance with a widely used standard, the 802.11 standard, for connecting computers wirelessly to local area networks.

Each domain may be assigned a range of frequencies such that, even within the domain, multiple users may communicate using different frequencies. As part of the regulation establishing a domain, a mechanism may be defined by which multiple users share the spectrum allocated for the domain without interfering with one another. In some instances, a domain is licensed, meaning that a specific frequency is assigned to a specific entity, at least within some limited geographic area.

In other instances, though the domain is unlicensed, limitations may be imposed on devices intended to communicate in the domain to avoid interference. For example, maximum power output limitations may be imposed to reduce the likelihood that transmission from one user's device will interfere with another user's device, which is not intended to receive the transmission. As another example, a device attempting to transmit in a particular domain may be required to sense whether a particular set of frequencies is in use prior to using those frequencies.

Despite the establishment of multiple domains, and techniques within each domain to avoid interference, there is a shortage of available spectrum for some uses. Unlicensed computer-to-computer communications and computer-to-peripheral communications are two examples of such uses. To make more frequencies available for such uses, it has been proposed to use unassigned bands of the licensed spectrum, referred to as "white space," which may exist for any of numerous reasons. For example, when frequency bands of the licensed spectrum are assigned to organizations, typically they are not assigned exactly consecutively; instead, there may be gaps between the licensed portions to prevent two entities from interfering with one another.

In particular, it has been proposed to use white space in the digital television domain for computer (e.g. computer-to-computer, computer-to-peripheral) communications because this spectrum has the advantage of being close in frequency to the frequencies used for computer communications. Also, there may be white space in a geographic region because there are fewer licensed TV stations in that region than the digital TV domain can accommodate. However, because the amount of available white space varies from location to location, such use of the digital TV spectrum is done cognitively, such that a computer determines whether a frequency is already in use, before using it. This determination may be made by a computing device sensing signals to find an unused channel or by consulting a database of licensed channels applicable in the location.

SUMMARY

Computer operations that require large amounts of bandwidth for wireless transmission are facilitated by equipping a computing device with a system that can transmit information by concurrently using multiple regulatory domains. The information may be an audio/video stream or other type of information that similarly consumes a large bandwidth. One of the domains, for example, may include the digital TV domain. Another of the domains may be a UNIT domain or an ISM domain.

A computing device may dynamically determine the amount of the information transmitted in each domain. This determination may be based at least in part on regulatory considerations. The amount of information transmitted in the licensed domain may be limited in part by regulation, which may limit which subchannels in domain that can be used and/or the maximum power level in each sub channel. Accordingly, the transmitter may include a mechanism to identify subchannels available for use in the licensed domain.

Alternatively or additionally, the determination of the amount of information transmitted in each domain may be made based at least in part on conditions in the available subchannels in either or both of the regulatory domains. Based on the permissible power level in the regulated domain and sensed noise, a supportable bit rate may be determined for each subchannel. Appropriate error control coding and modulation schemes may be selected to provide this bit rate. The remaining portion of the stream for transmission may then be transmitted in an unregulated domain.

As the availability or usability of subchannels, channels changes, the allocation of relative amounts of information for transmission in each regulatory domain may be updated.

Accordingly, in some embodiments, transmission in multiple domains may be achieved by separating a stream of data into multiple substreams. Each substream may be separately encoded using an error control encoder with a coding rate set based on channel conditions. The encoded streams may then be modulated to yield frequency components that may be transmitted at power levels, applicable to the respective domains in which each substream is transmitted.

A device receiving such a transmission may decode the incoming substreams separately. The substreams may then be combined into a single information stream that may be used to render a display, provide input to a speaker, or otherwise be processed.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have recognized and appreciated that a computing device may appear to be more responsive and generally behave consistently with user's expectations by transmitting concurrently in multiple regulatory domains. Concurrent use of multiple regulatory domains may make available more bandwidth for wireless communication, and increase the speed at which operations involving wireless communications can be performed. The amount of information transmitted in each regulatory domain may be adjusted dynamically based on regulations and/or channel conditions. The allocation may be specified by a relatively small number of parameters, such as a weighting applicable to the frequency components used to transmit each substream and/or a coding rate for an error control code.

Such an approach is well suited for use in transmitting a media (e.g., audio or video) stream for display on a peripheral device, such as a television. Using such a technique, a computing device is likely to be able to wirelessly transmit a media stream at a sufficiently high bandwidth, for instance, to provide high-resolution images at a sufficiently high frame rate to yield a high quality audio/video presentation. Thus, a computing device may be configured to act as a media controller for streaming audio/video information to display devices, such as televisions or devices with audio speakers.

Figure 1:
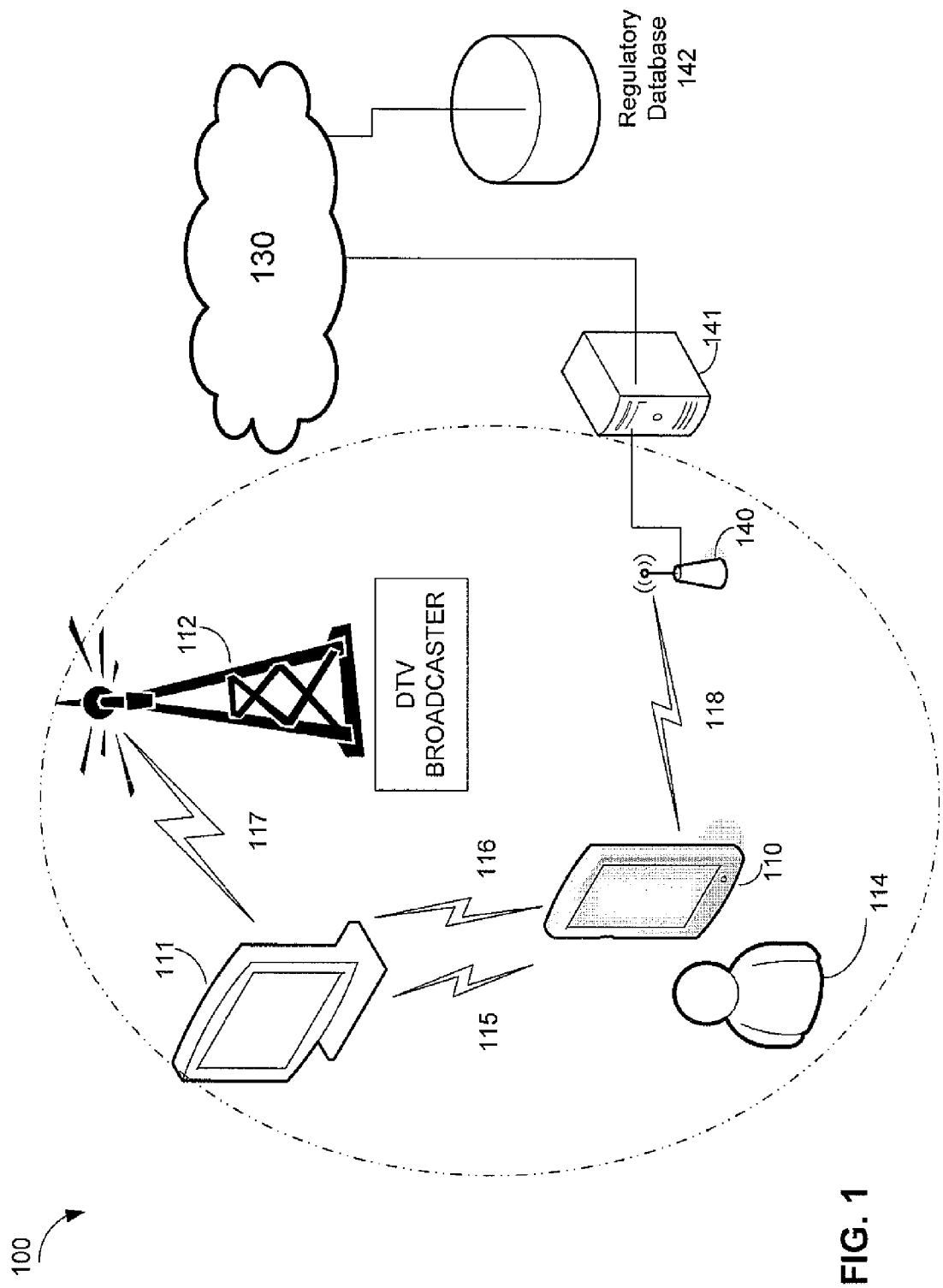
FIG. 1 shows an exemplary system for the communication of information by concurrently using multiple regulatory domains, in accordance with some embodiments of the present disclosure.

FIG. 1 shows an exemplary system 100 that may be operated to transmit information in at least two regulatory domains. The exemplary system 100 comprises a computing device 110, a television 111, a digital TV broadcaster 112, and a wireless access point 140 connected to a server 141, which is in turn connected to a regulatory database 142 via a network 130. The computing device 110 is connected wirelessly through a channel 118 to the wireless access point 140, and may wirelessly transmit information to the television 111 using channels 115 and 116. In this example, channels 115 and 116 may be in different regulatory domains. The digital TV broadcaster 112 transmits information to the television 111 using channel 117.

The example system 100 may be implemented in any number of ways, and may comprise alternative and/or additional elements (e.g., peripheral devices, computers, spectrum users). The computing device 110 may be any communication-enabled computing device such as a laptop, personal digital assistant, media server, or media controller and may communicate with any system component (e.g., television, wireless access point) using one or multiple wireless channels or wired connections.

The television 111 may be capable of wired and wireless communication, may be equipped with a radio, and may communicate with other devices including servers, handheld computing devices, and broadcasters. The network 130 may comprise, for example, the Internet, a LAN, a WAN and/or any other wired or wireless network, or combination thereof.

Wireless communications may be implemented using many different wireless communication technologies. For instance, Wireless Local Area Networks (WLANs) based on IEEE 802.11 standards, Wi-Fi infrastructure mode or Wi-Fi Direct connections, Wireless Personal Area Networks (WPANS), Wireless Wide Area Networks (WWANs), and Wireless Regional Area Networks (WLANs) may be employed. Technologies conforming to IEEE 802.11 standards, such as the 802.11a,b,g, and n standards may be employed.

The computing device 110 may stream media wirelessly to another device, such as a computer and/or a peripheral device. In the system 100, for example, the device 110 may wirelessly transmit information for real-time display on the digital television 111. The information may include a data stream representing streamed media of any suitable type. For instance, it may comprise audio content, video content, or some combination thereof.

The device 110 may stream data over multiple regulatory domains. This may be useful in the case that there is not enough bandwidth on available channels in any one domain to transmit the data stream at a rate to meet a user's expectations. For example, for a media stream transmitted for real-time presentation, a lack of bandwidth may reduce the data rate, and may result in quality degradation of the presented media. Audio may sound "noisy" or video may appear "grainy" or "jerky."

In the example system 100, the computing device 110 may transmit over channel 115, comprising a set of frequencies in an unlicensed regulatory domain, and channel 116 comprising an additional set of one or more frequencies in a different domain. The device 110 may determine which frequencies are included in channels 115 and 116. For instance, the channel 116 may comprise a set of one or more frequencies in the white space of a digital TV domain or in the white space of another licensed domain. Alternatively and/or additionally, the channel 116 may include frequencies in an unlicensed domain. For example, frequencies in the ISM or UNIT domains—distinct from the frequencies comprising channel 115—may be included.

In order to transmit information over multiple domains, the device 110 may dynamically determine how much of the information should be transmitted over each domain. This determination may be based on any of numerous criteria. For instance, regulatory criteria may be considered. In licensed domains, such information may comprise a list of assigned subchannels within certain geographic areas, and/or may comprise white spaces in these areas. Furthermore, regulations may impose limits on maximum and/or average power outputs for frequencies in licensed and unlicensed domains alike. Transmissions over channel 116, for example, may be required to be at a power level low enough that they do not interfere with transmissions of the DTV broadcaster 112 over the licensed domain channel 117. Another criterion for determining how to split information across multiple channels may be channel conditions such as the presence of noise and/or other sources of interference.

The computing device 110 may use regulations and/or channel conditions to determine which frequencies to include in channels 115 and 116, to decide how to divide the data stream to be sent out into multiple substreams, and to assign substreams to channels. The computing device 110 may have the regulatory requirements readily available (e.g., stored in memory) or may obtain them from an external source. For instance, computing device 110 may connect to a regulatory database 142, which may contain the appropriate regulations such as the subchannels available for use in the licensed domain along with the associated power limits. In order to connect to the database 142, the device may use the wireless connection 118 to a wireless access point 140, which is in turn connected via a wired connection to the server 141. The server 141, may access the regulatory database 142 through a network 130. Other means for the device 110 to connect to the regulatory database 142 may be additionally, or alternatively defined, as embodiments of the invention are not limited in this respect.

The computing device 110 may further sense and/or otherwise become aware of channel conditions to determine how much information may be sent over each channel. In the example system 100, the computing device 110 may sense signal power levels within channel 116 before transmitting over that channel.

Regardless of what information is collected or how it is collected, the computing device 110 may use this information to decompose the data for transmission into portions that can be transmitted over channels, which may be in different regulatory domains.

For example, the device 110 may then transmit data over channels 115 and 116 to the digital television 111. The device 110 may employ any suitable appropriate error correcting and modulation schemes for this purpose. Because channel conditions, channel availability, and other constraints may vary over time, the device 110 may dynamically alter the channels used for transmission as necessary. Other aspects of the system may be varied as well, including the error correction and modulation schemes, coding rate, and power outputs in each frequency.

Figure 2:
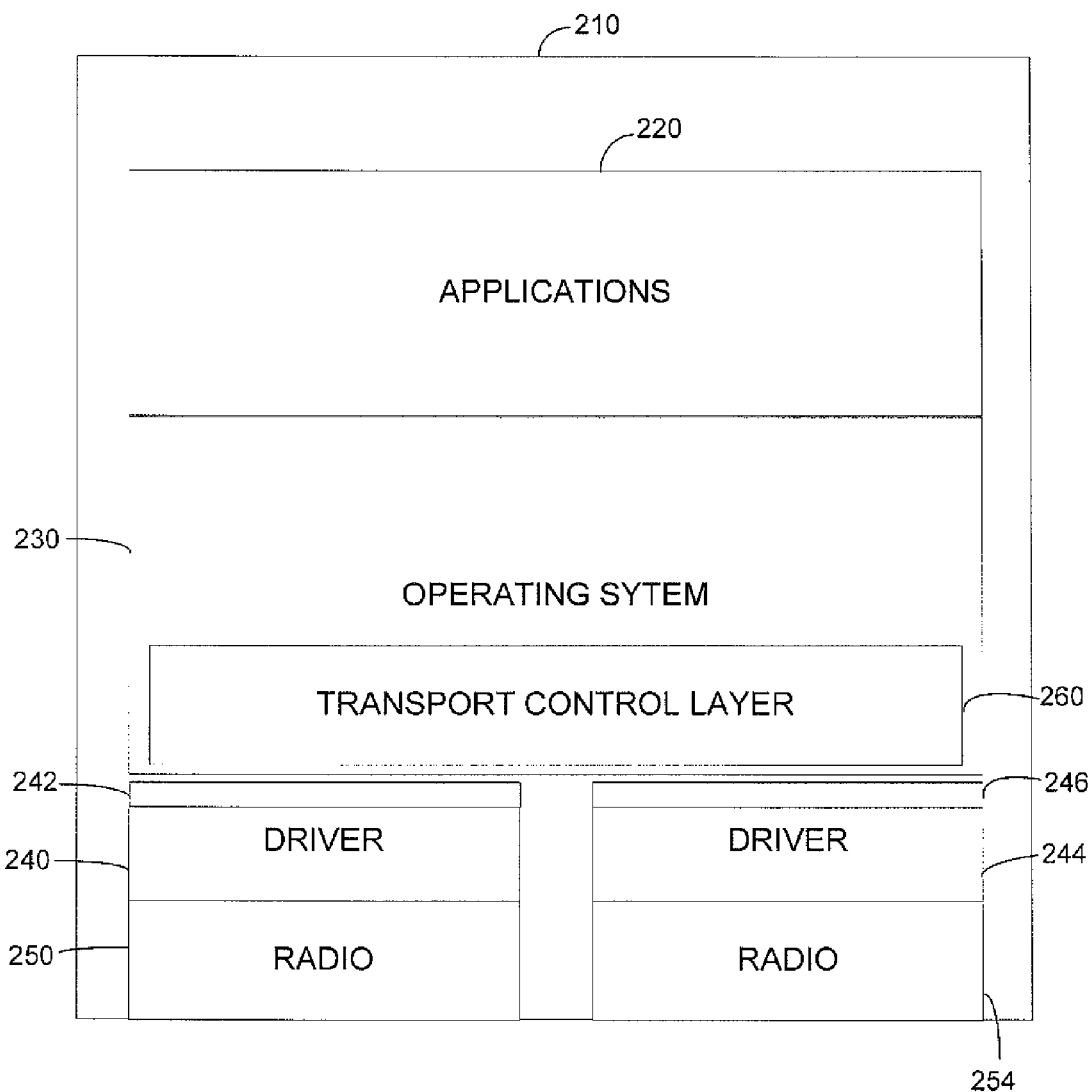
FIG. 2 shows an illustrative architecture for a computing device that may be operated to transmit information in at least two regulatory domains, in accordance with some embodiments of the present disclosure.

FIG. 2 illustrates, at a high level, an architecture for computing device 210 that may be operated to transmit and/or receive information in at least two regulatory domains. In the example of FIG. 2, computing device 210 includes two radios, radio 250 and radio 254. Each of the radios may be adapted to send and receive wireless communications. Radio 250, for example, may be used for wireless communication in a first domain. Radio 254, for example, may be used for wireless communication in a second domain. Though, it should be appreciated that, in some embodiments, a radio may support transmission of information in multiple domains such that a single radio may be used to support concurrent communication in multiple domains.

In the example of FIG. 2, an application 220 is illustrated. Application 220 may generate information for wireless transmission or may process information received wirelessly. In the embodiment illustrated, that information may be an audio/video stream, which may contain data representing audio content and/or video content, and possible other information, such as control information.

As a specific example, application 220 may be a media controller, configuring computing device 210 to provide a user interface through which a user may select audio/video content to be streamed to a display device, such as a television. Though, it should be appreciated that a device receiving and presenting an audio/video stream may have a similar architecture. In such an embodiment, application 220, rather than being a media controller, may be computer-executable components that receive and render the audio/video stream.

In the example of FIG. 2, application 220 interfaces with operating system 230. In some embodiments, operating system 230 may be a general purpose operating system, such as the WINDOWS® operating system. Such a configuration may be desirable when computing device 210 executes applications other than application 220. Though, in embodiments in which computing device 210 is configured specifically for presentation of audio/video information, operating system 230 may have more limited functionality.

Regardless of whether operating system 230 is a special purpose or general purpose operating system, in the embodiment illustrated, a function of operating system 230 is to provide services that facilitate wireless transmission and reception of information processed by application 220. For transmission, operating system 230 may receive a request from application 220 to establish a connection with a nearby device. Thereafter, operating system 230 may receive from application 220 a stream of data representing audio/video content to be transmitted over that connection.

In embodiments in which computing device 210 is receiving and presenting audio/video data, operating system 230 may respond to a request, received wirelessly, from another device to establish a connection. Operating system 230 may then provide data received over that connection to application 220 for processing, including presentation of the information.

Such a connection may be formed using techniques as are known in the art. In the illustrated example, that connection may be a direct, device-to-device connection. Though any suitable technique may be used.

In the embodiment illustrated, a specific transport used for a connection may be selected by operating system 230. Accordingly, a transport control layer 260 may be included within operating system 230 to establish a transport for a connection. For example, a wireless link established in either the UNIT or the ISM domain may be used as a transport. Alternatively, a wireless link established in a licensed domain, such as the Digital TV domain, may be used as a transport. Though, in the embodiment illustrated, a link established by concurrent transmissions in multiple regulatory domains may act as the transport.

Transport control layer 260 may receive information generated by application 220 defining the characteristics of a transport required for a connection. For example, application 220, upon requesting a connection may indicate a requested bit rate for the connection. Transport control layer 260 may select one or more transports that collectively provide sufficient bandwidth to support the requested bit rate. In an embodiment in which the transport is established by concurrent transmissions in multiple regulatory domains, transport control layer 260 may select one or more subchannels in each domain, and associated parameters of communication on those subchannels, to achieve the desired bit rate.

Transport control layer 260 may also respond to received information. That received information may define a link requested by another device. Such a link may span multiple regulatory domains. Regardless of whether the link is requested by another device or an application 220 executing on computing device 210, when data is received in the separate domains used to form the link, transport control layer 260 may combine data received in each of the domains for processing on computing device 210.

To send and receive data, transport control layer 260 may interact with one or more radios, of which radios 250 and 254 are illustrated. Radio 250 may be controlled through software, represented as driver 240 in FIG. 2. Here, driver 240 includes an interface 242 through which operating system 230 may issue commands to driver 240 and through which driver 240 may report status and notify operating system 230 of received data. Interface 242 may be implemented in any suitable way, including according to a known standard. An example of such a known standard is called NDIS, but that standard is not critical to the invention.

Interface 242 may support a number of commands in a format that does not depend on the construction of radio 250. These commands may include commands to configure radio 250 for transmission at certain frequencies or to use certain modulation schemes or error control coding for symbols to be transmitted. Additionally, through interface 242, driver 240 may receive data for transmission by radio 250. Accordingly, interface 242 provides a mechanism through which transport control layer 260 may control radio 250 to transmit data representing a substream or to process data received from radio 250 representing a substream.

Regardless of the specific commands, driver 240 may translate the commands, in the standardized format of interface 242, into specific control signals that are applied to radio 250. Additionally, driver 240 may be programmed to perform certain low level functions associated with a wireless connection. For example, upon receipt of a packet, driver 240 may check that the packet is properly formatted. If the packet is properly formatted, driver 240 may control radio 250 to generate an acknowledgement. Conversely, if the packet is not properly formatted, driver 240 may control radio 250 to transmit a negative acknowledgement.

Though driver 240, and in some instances radio 250, may automatically perform low level functions associated with establishing and maintaining a wireless connection, higher level functions may be performed under control of operating system 230 or applications 220. In some embodiments, an application 220 or operating system 230 may provide a user interface such that ultimate control of wireless communication is provided by a user of computing device 210.

In the embodiment illustrated in FIG. 2, computing device 210 includes a second radio 254. While radio 250 may be used, for example, for transmitting and receiving frequency components in a first regulatory domain, radio 254 may be used for transmission and reception in a second regulatory domain.

Radio 254 is incorporated into computing device 210 with generally the same architecture as radio 250. Radio 254 is associated with a driver 244 that provides a mechanism for operating system 230 to control radio 254. Driver 244 has an interface 246 through which operating system 230 may send commands to driver 244 and driver 244 may provide status to operating system 230. Interface 246, like interface 244, maybe a standardized interface such that operating system 230 may communicate with driver 244 using a similar set of commands as are used to control driver 240.

Figure 3:
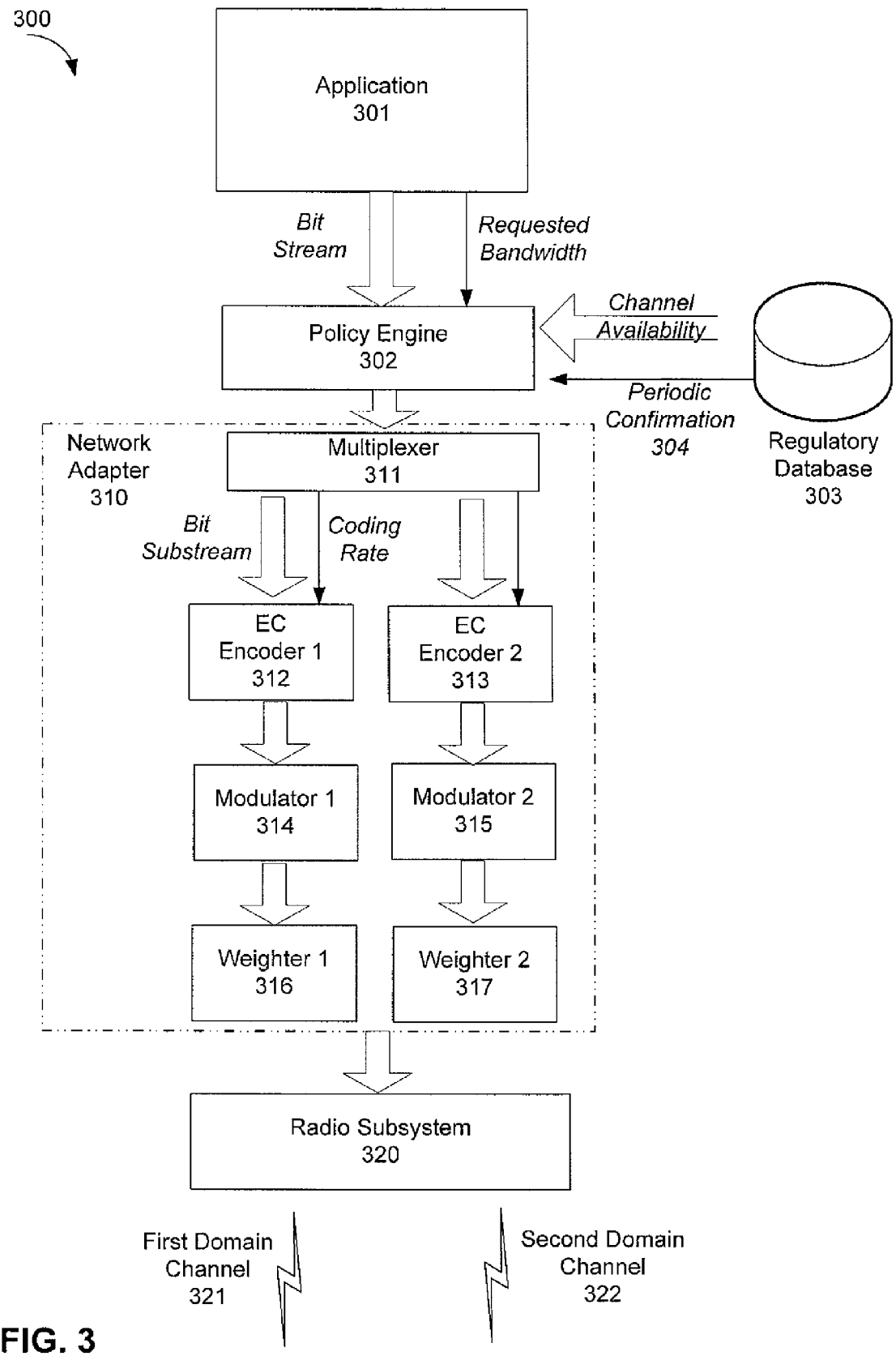
FIG. 3 shows a block diagram of an exemplary system for transmission of information using multiple regulatory domains that may be implemented on a computing device, in accordance with some embodiments of the present disclosure.

FIG. 3 shows a block diagram of some of the components of an illustrative system 300, for transmission of information in multiple regulatory domains, implementing techniques described herein. The system 300 comprises an application 301 that may generate or process information for wireless transmission, a policy engine 302 that may determine how to transmit the information over multiple domains, and a network adapter 310 configured to accept a bit stream and prepare it for subsequent wireless transmission by a radio subsystem (320). The radio subsystem may transmit the bit stream using multiple regulatory domains. In the system 300, for instance, a first regulatory domain may comprise a first domain channel 321, and a second regulatory domain may comprise a second domain channel 322. In some instances the first domain channel 321 may be the same as the second domain channel 322, and in other instances the channels may be different.

The system 300 may be implemented in any number of ways. For instance, the system 300 or any of its components may be implemented on a computing device such as the device 210 shown in FIG. 2 or a plurality of computers. In some embodiments, the system 300 may include a copy of a regulatory database internal to such a computing device. Though, in the embodiment illustrated in FIG. 3, the regulatory database 303 may be an external source of information about channel availability and regulations governing channel use. Communications among any subset of components (e.g., between the policy engine 302 and the regulatory database 303 or between the encoder 312 and modulator 314) may be realized using any suitable means such as wired connections, wireless connections, and networks. The radio subsystem 320 may transmit over one domain or over multiple domains using one or multiple channels. Each domain may be a licensed domain (e.g., digital TV band) or an unlicensed domain (e.g., UNII and ISM bands).

The application 301 may be any suitable content-generating application. It may be an application for generating information for wireless transmission such as the application 220 shown in FIG. 2. The content may be represented as a media stream such an audio/visual stream or any other data stream comprising, for instance, an ASCII text file or compiled bytecode. The application 301 may provide the generated content to a policy engine 302 for further processing in preparation for subsequent wireless transmission.

The policy engine 302 may obtain information which it may use to dynamically decide how to separate the stream of information from the application 301 into multiple substreams that may be transmitted in multiple domains. The policy engine 302 may determine parameters relating to transmission of these bit streams, such as the number of bit substreams to be used, which domains and channels each substream may be transmitted over, and/or what coding rate may be used for transmission over each channel. The number of substreams may be any suitable number, and, for example, maybe two substreams as shown by the two parallel tracks in FIG. 3 (and the associated two parallel tracks shown in FIG. 4, that will be discussed below). The policy engine 302 may determine a coding rate for each channel based on channel conditions, which may be either dynamically or previously determined by the policy engine 302 or another system component, such as the radio subsystem 320.

The policy engine 302 may use the regulatory database 303 to check for availability of channels in each licensed domain considered. For instance, the policy engine 302 may obtain a list of available white space channels in the digital TV domain. The policy engine 302 may use this information to select frequencies in the digital TV domain that can be used for transmission of a portion of the data stream.

In some embodiments, information on the availability of white space channels may change from time-to-time. Policy engine 302 may include a mechanism to account for such changes. Such a mechanism may entail repeating the selection of frequencies, to use for transmission, from time-to-time based on changes in availability of white space channels or channel conditions or other factors.

Policy engine 302 may obtain information with changes in the available white space channels in any suitable way. For example, the policy engine 302 may receive a specific time period over which each channel is available. The time periods may differ from one channel to the next, and this information may be updated periodically 304.

The policy engine 302 may further obtain regulatory limitations for transmission over channels in licensed and unlicensed domains. These limitations may include limitations on the maximum transmission power in each channel/ frequency and limitations on the average transmission power across all frequencies in a channel and/or multiple channels. This data may be obtained from regulatory database 303, may be preprogrammed into policy engine 302, stored as a configuration parameter of policy engine 302, and/or provided in any other suitable way.

After determining the number of substreams to split the application 301 bit stream into, the policy engine 302 may forward the data stream to the network adapter 310 along with any associated control information. Examples of control information include what channels to transmit each substream over and the associated coding rates. The coding rate may be selected based on channel conditions. Control information may further include instructions for the type of error control coding and modulation schemes to be used prepare each data substream for transmission.

The network adapter 310 comprises a multiplexer 311, two error control (EC) encoders (312, 313), two modulators (314, 315) and two weighters (316, 317). Many alternative implementations are possible. For instance, the network adapter 310 may comprise one or a plurality of encoders, modulators, and weighters. Additionally, or alternatively, the adapter 310 may include other components for implementing various signal processing tasks associated to source and channel coding. The network adapter 310 may forward any information from the policy engine 302 to any of its components. In particular, the network adapter 310 may forward the application data stream to the multiplexer 311, which may split the data stream into multiple bit substreams and forward each to an error control (EC) encoder. In the example network adapter 310, the multiplexer 311 splits the application data stream into two substreams and sends a first substream to a first EC encoder 312 and a second substream to a second EC encoder 313. The multiplexer 311 may send the coding rates associated to each substream to the appropriate EC encoders.

The EC encoders 312 and 313 may encode the data into symbols according to a selected error-control code (ECC) prior to transmission. Error control codes aid in identifying data corruption and, despite its presence, allow for effective communication. Each ECC has its own rules of construction that define valid symbols. Transmitting data in a signal as a limited set of valid symbols may allow a receiver of the signal to identify that an error has occurred during decoding, when received data does not match a valid symbol. A receiver may then determine the transmitted data, with high likelihood, by matching the corrupted data to a valid symbol, which may be decoded to output the original data. Any suitable ECC may be used by the EC encoders 312 and 313. Examples include block codes, convolutional codes, concatenated codes, low-density parity check (LDPC) codes. The EC encoders 312, 313 may use the coding rate received from the multiplexer 311 or any other system component to select a specific code and parameter of that code to achieve the desired coding rate. After encoding the data substreams, the EC coders 312 and 313 may forward the encoded substreams to the modulators 314 and 315.

The modulators 314 and 315 may transform the encoded substreams to yield frequency components for controlling signal transmission in the channels that were associated to each substream by the policy encoder 302. The modulators 314 and 315 may use any of numerous modulation techniques. For instance, digital modulation schemes such as phase-shift keying (PSK), frequency-shift keying (FSK), amplitude-shift keying (ASK), quadrature amplitude modulation (QAM) may be employed. Alternatively, analog modulation methods such as double-sideband modulation (DSM), frequency modulation (PM), and phase modulation (PM) may be used. However, many alternate implementations of the coding and modulation steps are possible. For instance, the coding and modulation schemes may be done jointly rather than in series.

The modulation may be done in any suitable components. In some embodiments, modulators 314 and 315 may include digital and/or analog components. As one example, each modulator may perform digital processing to compute a Fast Fourier Transform or (FFT) of a data substream. The output of such a circuit may be used to determine frequency components to be transmitted to represent the encoded substream. Though, in other embodiments, other components alternatively or additionally may be used.

The frequency components produced by the modulators 314 and 315 for first and second bit substreams may be weighted by the weighters 316 and 317 respectively. The weighting may be done in the frequency (i.e., Fourier) domain or, equivalently, in the time domain.

The weighting may be accomplished by multiplying the frequency components produced by the modulators 314 and 315 by a time-variant (i.e., time-dependent) function. The time-variant function may be a set of time-dependent weights. There may be a single weight assigned to each frequency value. The weights may depend on the regulatory limitations obtained by the policy engine 302, on channel conditions and any of numerous other factors. For instance, the weights may represent upper bounds on the total transmission power in each frequency or in a channel. In some embodiments, the weights may limit the transmission power in a set of frequencies to zero, meaning that no signal is to be sent out over this set of frequencies. Additionally, or alternatively, the weights may be such that their application to the frequency components effectively limits the average power of the transmitted signal, wherein the average is computed over the channel frequencies or a subset thereof.

In some instances, the same set of weights may be applied by the weighters 316 and 317 and a different set of weights may be used in other instances. In some embodiments, the weights may vary as a function of time and/or frequency. For instance, the weight associated to frequency $f_1$ and the weight associated to frequency $f_2$ may differ from one another. In another example, the weight associated to frequency $f_1$ at time $t_1$ may differ from the weight associated to frequency $f_1$ at time $t_2$. Note that the weighting step may be performed at different times. For instance, it may be performed prior to modulation by the modulators 314 and 315.

Policy engine 302 may compute the weights to achieve one or more purposes. The weights may be set, for example, to ensure that transmit power in each domain is consistent with protocols and regulations applicable to that domain. As a simple example, the weights may be set to ensure that transmitted power in any regulatory domain is at or below power limits for unlicensed use of that spectrum. Additionally and/or alternatively, the weights may be set so as to increase the total data rate of transmission. In accordance with a communication theory called Shannon's Water-Filling Theorem allocating more transmit power to more reliable subchannels can improve data transfer rates. This allocation may be made based on the maximum power that can be transmitted in a domain based on regulations. Alternatively, the theories can be applied across all regulatory domains to ensure total transmit power is below a selected value. That theorem, or other suitable approaches, may be used to allocate power to frequency components by setting weights as a function of frequency.

The frequency components produced by the modulator 314 and weighted by the weighter 316 using a first time-variant function may be sent to the radio subsystem 320 for transmission on a first regulatory domain channel 321, along with any necessary control information. Similarly, the frequency components produced by the modulator 315 and weighted by the weighter 317 using a second time-variant function may be sent to the radio subsystem 320 for transmission on a second regulatory domain channel 322.

The radio subsystem 320 may transmit over one or multiple channels using any suitable means. For instance, the radio subsystem may comprise at least one radio frequency (RF) transmitter (not shown) and at least one antenna (not shown) so that the encoded, modulated, and weighted substreams may be passed to the RF transmitter, applied to the antenna and wirelessly transmitted over the first domain channel 321 and the second domain channel 322.

Figure 4:
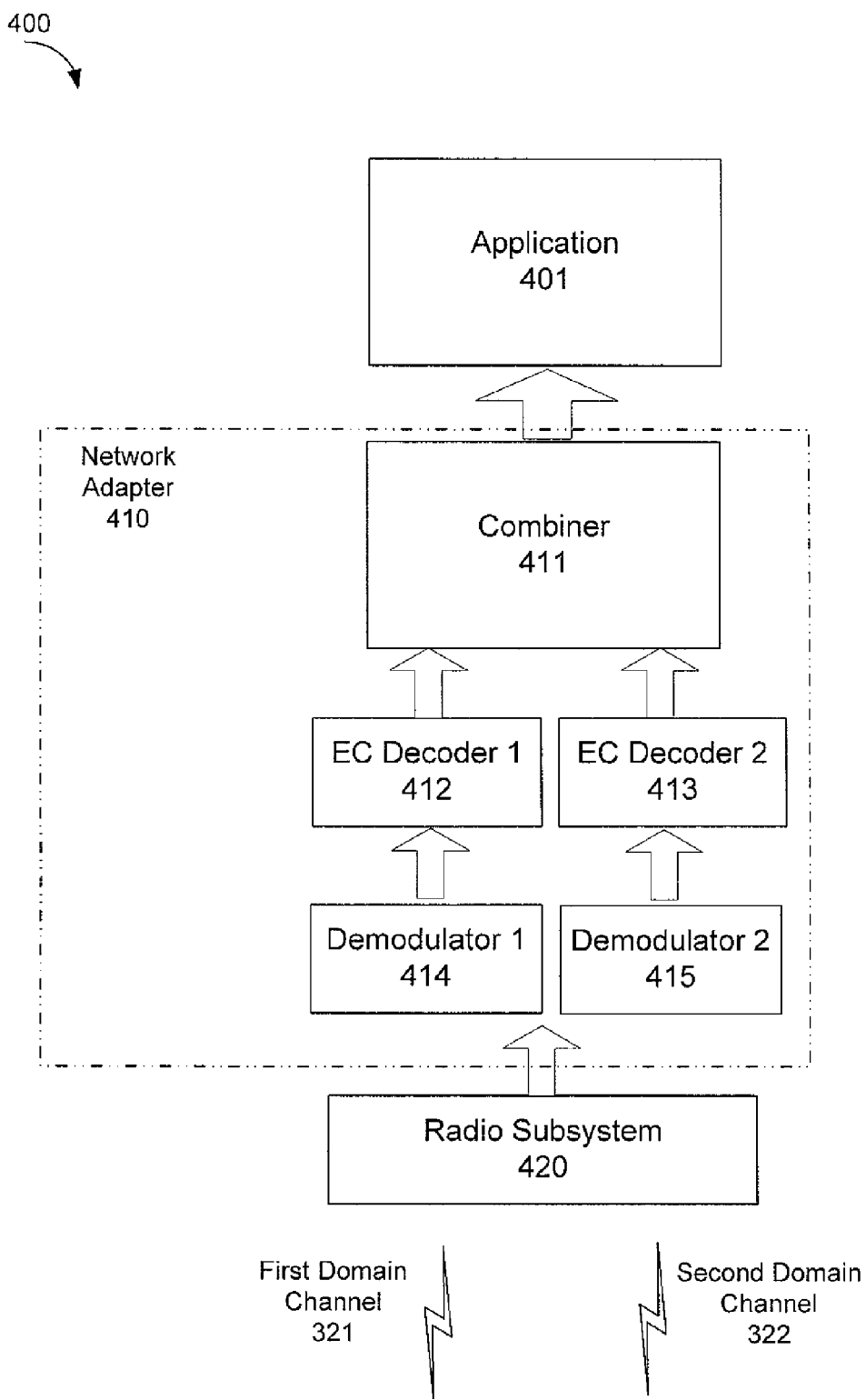
FIG. 4 shows a block diagram of an exemplary system for the reception of information from at least two regulatory domains that may be implemented on a computing device, in accordance with some embodiments of the present disclosure.

Complementary operations may be performed as a receiver to receive the data stream. FIG. 4 shows a block diagram of some of the components of a system 400, for the reception of information from at least two regulatory domains, in accordance with some embodiments of the present disclosure. The system 400 comprises a radio subsystem 420 for receiving data streams across multiple domains. A network adapter 410 accepts bit substreams received by the radio subsystem 420 and prepares a data stream for subsequent use by the application 401.

The system 400 may be implemented in any number of ways. For example, the system 400 or any of its components may be implemented on a computing device such as device 210 shown in FIG. 2 or a plurality of computers. Communications among any subset of components (e.g., between the application 401 and the network adapter 410 or between the decoder 413 and the demodulator 415) may be realized using any suitable means such as wired connections, wireless connections, and networks. The radio subsystem 420 may receive over one domain or over multiple domains using one or multiple channels. Each domain may be a licensed domain (e.g., digital TV) or an unlicensed domain (e.g., UNII, ISM). For instance, the first domain channel 321 may be in UNII or ISM domain and the second domain channel 322 may be in a digital TV domain or vice versa. Alternatively, both channels 321 and 322 may both be in an unlicensed domain.

The radio subsystem 420 and network adapter 410 may be configured to receive one or multiple data substreams. For instance, the radio subsystem 420 may be made aware of specific channels over which to receive substreams and the network adapter 410 may be made aware of what ECC and modulation scheme were employed to encode and modulate the data substream prior to transmission so that an appropriate demodulation and EC decoding scheme may be used to demodulate and decode the received substream.

The radio subsystem 420 may receive a substream on channel 321 and another substream on channel 322, and may pass the received substreams to the network adapter 410. The network adapter 410 comprises two demodulators (414, 415), two EC decoders (412, 413) and a combiner 411. The received substreams, comprising frequency components, may be passed to demodulators 414 and 415. For instance, the frequency components received on channel 321 may be passed to the demodulator 414 and the frequency components received on channel 322 may be passed to the demodulator 415. Many alternative implementations are possible, and these components may be implemented using technology similar to that used to implement system 300, though complementary operations may be performed. For example, demodulators 414 and 415 may be implemented as inverse FFTs. In some embodiments one demodulator may be used to process multiple streams. In other embodiments, the demodulators may be part of the radio subsystem 420 rather than the network adapter 410.

The frequency components may be sent from the demodulators 414 and 415 to EC decoders 412 and 413, respectively. The EC decoders may decode the frequency components into bit substreams that may subsequently be combined into a single data stream by the combiner 411. The EC decoders may further correct any errors in the received data to increase the likelihood of accurately recovering the transmitted data. The combiner 411 may send the combined bit substreams to an application 401.

The application 401 may be any suitable application for receiving and processing content. It may be an application for receiving and processing information wirelessly, such as the application 220 shown in FIG. 2. It may have similar structure to the application 301, or may be substantially different. In some embodiments, a system 300 and system 400 may be implemented in the same computing device such that the computing device can both transmit and receive data. The received content may be a media stream such as an audio/visual stream or any other data stream such as an ASCII text file or byte code. The application 401 may process the received content in any number of ways. For example, the application 401 may render a display device (e.g., the screen of the computing device 110 or the television 111 both shown in FIG. 1) by using a received audio/video stream. Additionally, or alternatively, the application 401 may forward the data stream to another application or manipulate the data in any suitable way.

Figure 5A:
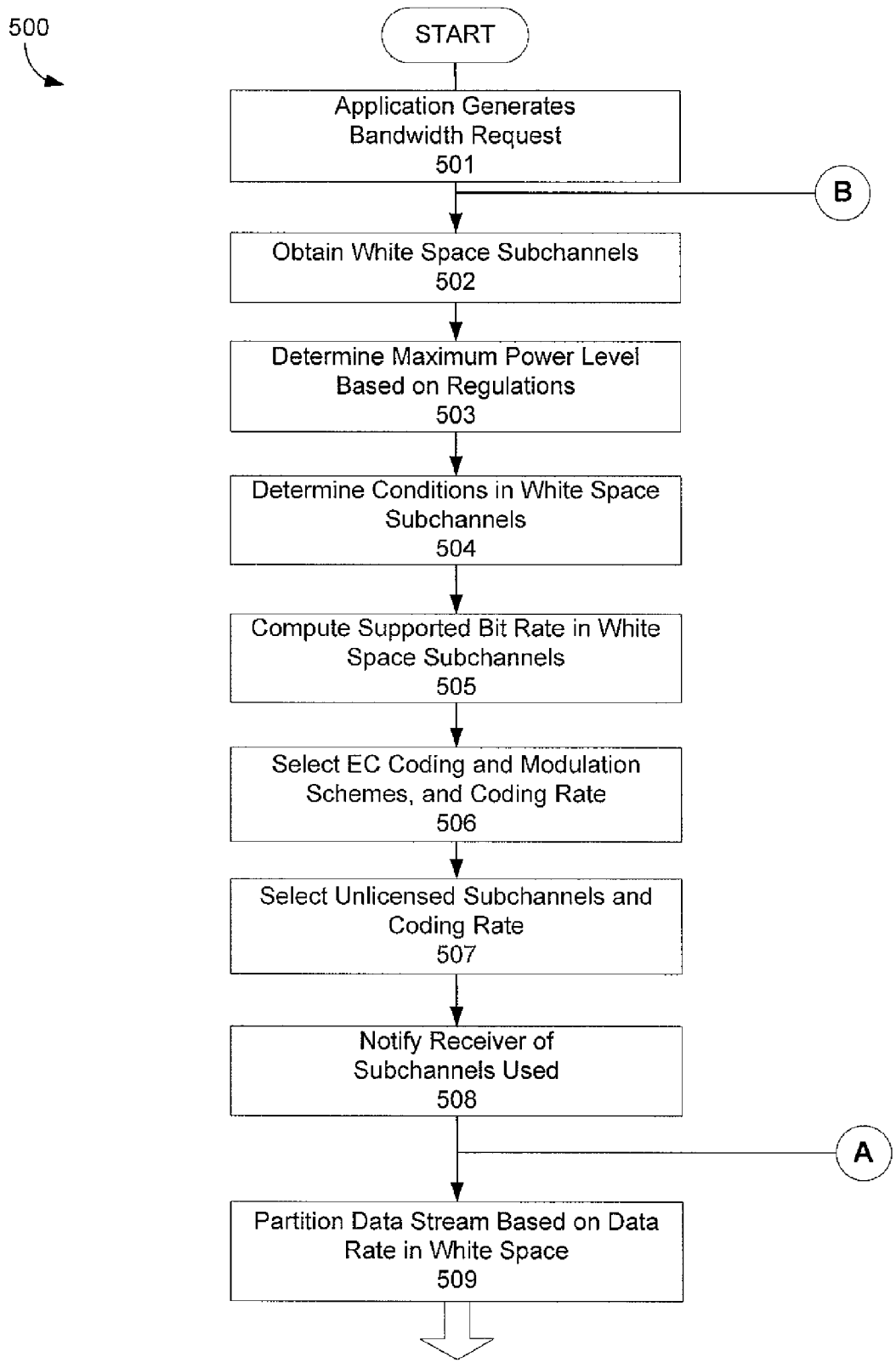
FIG. 5a and FIG. 5b show an illustrative process for the concurrent transmission of information over at least two regulatory domains, in accordance with some embodiments of the present disclosure.
Figure 5B:
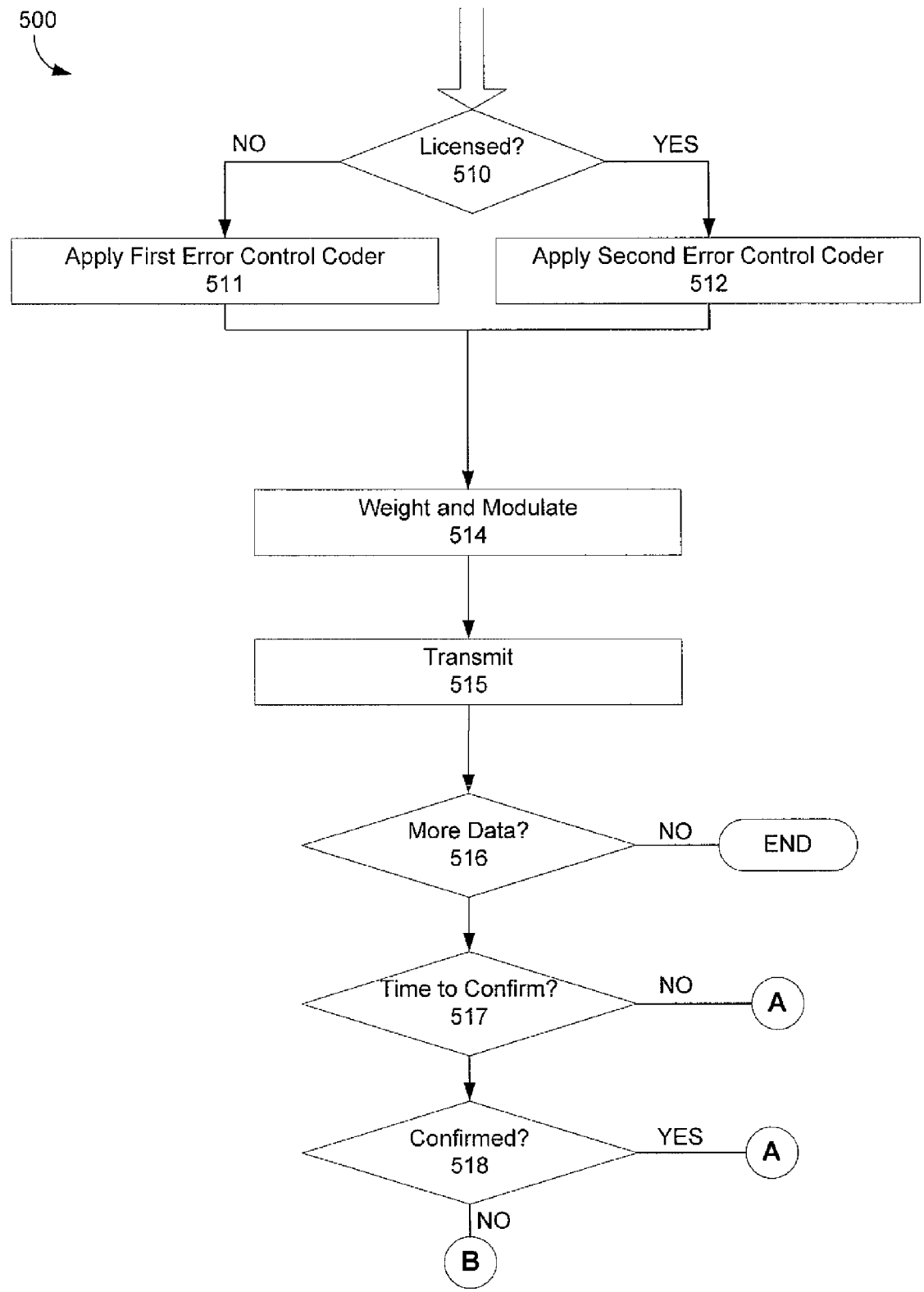

FIG. 5*a* and FIG. 5*b* together show an illustrative process 500 for the transmission of information over at least two regulatory domains, in accordance with some embodiments of the present disclosure. In this example, the process 500 may attempt to transmit data over an unlicensed domain and/or white space of a licensed domain, but other alternative combinations of regulatory domains may be employed. This process may be performed by a system 300 as described in connection with FIG. 3 or any suitable components.

The process begins in act 501 with an application (e.g., the application 301 in FIG. 3) generating a request for bandwidth. The amount of bandwidth requested may be determined by the application, and may depend on the amount of data that needs to be transmitted and the time interval within which the transmission needs to occur.

In act 502, the process may receive a listing of available white space subchannels and associated regulations for transmitting across these subchannels. This information may, for instance, be obtained by policy engine 302 from a regulatory database 303 as shown in FIG. 3, or be obtained by any other suitable means. This information may further include a time interval $[t_i, t_f]$ for each channel, over which each of the subchannels will be available. As one example, an external source providing access to a regulatory database 303 may indicate that a channel is available for use as a white space channel, and may indicate a time $t_f$ until which that channel is available. If use of the subchannel were required after time $t_f$, the process may once again request a list of available white space subchannels to determine whether that channel is still available. In this way, the value $t_f$ indicates a time at which policy engine 302 may redetermine which white space channels are available for use. Though, it should be appreciated that other mechanisms may be used. For example, the ending time $t_f$ need not be expressly specified. As one possible alternative, policy engine 302 may recheck from time to time whether the allocated white space subchannels remain available. As another alternative, a server, such as server 141 (FIG. 1), or other component providing access to regulatory information may periodically report on the continued availability of white space channels. In such an embodiment, policy engine 302 may monitor such reports and, if a report confirming the continued availability of a white space subchannel is not received within an expected interval, policy engine 302 may cease use of the white space subchannel.

Transmission restrictions may be used to determine an appropriate power level in each subchannel. For instance, maximum transmission power levels in each subchannel may be set in act 503. Similarly, the average transmission power level across all frequencies in a subchannel may be set accordingly. These power levels may be determined based on regulations, standards, and/or other suitable criteria. To enforce determined power levels, weights may be computed by the process 500 and provided to other system components such as the weighters 316 and 317 illustrated in FIG. 3.

In act 504, the conditions in the available white space subchannels may be determined using any suitable means. For instance, the conditions may be sensed by passively listening on the subchannels or actively probing the channels, this passive listening, for example may be performed within radio subsystem 320 (FIG. 3) or other suitable component in a computing device executing process 500. Alternatively, the channel conditions may be obtained from another suitable source, such as a nearby computing device, an access point, or a base station.

The process continues in act 505, by computing the capacity of each white space subchannel, that is determining a supported transmission bit rate using conventional communication and information theory techniques. This calculation may depend on a number of factors including the bandwidth, maximum transmission power level, and amount of noise in each subchannel. The maximum transmission power level for each of the white space subchannels may be determined in any suitable way. As one example, the maximum transmission power level may be set based on regulations limiting transmission power in a specific domain. Though, other criteria may alternatively and/or additionally be employed. For example, the maximum transmission power level may be set based on capabilities of radio subsystem 320 or may be limited to preserve battery life in a portable electronic device. In some embodiments, the maximum transmission power level in each of the white space subchannels may be the same. Though, in other embodiments, the maximum transmission power level in each of the white space subchannels may be selected based on conditions of the subchannel. For example, Shannon's Water-Filling Theorem may be applied to allocate an available amount of transmission power among subchannels by preferentially allocating power to subchannels with lower noise levels to improve the overall transmission data rate. Other factors may be taken into account as well. For instance, the capacity of neighboring channels may be taken into account. The supported bit rate may be computed as a solution to an optimization problem such as, for example, attempting to maximize the data rate in each subchannel.

In act 506, the process may select an appropriate EC coding and modulation scheme along with an associated coding rate for each subchannel. These choices may depend on the capacity of each subchannel and may be made in any suitable manner. In preferred embodiments, these choices are made so as to achieve the smallest possible bit error rate while transmitting at or near the capacity of each sub channel. Though, in some embodiments, other criteria may be used. As one example, the coding rate of an error correcting code and a modulation scheme may be selected to increase overall channel throughput. Multiple subchannels in the same regulatory domain may either employ the same EC coding and modulation schemes or different ones. As a result of acts 501-506, the process 500 may have obtained at least one subchannel in the white space of a licensed domain and various parameters (e.g., coding rate, power level) that may be used for controlling transmission over the at least one subchannel.

As a result of these computations a data rate that can be transmitted through the white space subchannels can be obtained. It should be appreciated that other computations, alternatively or additionally, may be performed to arrive at an estimate of the data rate supportable in identified white space subchannels. Regardless of how the estimate of the data rate that can be supported by the available white space subchannels, there may not be enough bandwidth to transmit all the data in the white space subchannels obtained according to acts 501-506 of the process 500. The process 500 may obtain the rest of the required bandwidth in an unlicensed domain. Accordingly, in act 507, the process may select a number of unlicensed subchannels for transmission. The process may further obtain regulatory information controlling the maximum power levels for transmission over these subchannels, sense or otherwise obtain subchannel conditions, determine the maximum bit rate in the subchannels, and select EC coding and modulation schemes along with a coding rate for each subchannel. As a result, the process 500 may have obtained at least one subchannel in an unlicensed domain (e.g., UNIT band) and various parameters (e.g., coding rate, power level) that may be used for controlling transmission over the at least one subchannel.

Accordingly, FIG. 5 illustrates a process 500 in which transmission of a data stream is split between an unlicensed domain and a licensed domain. It should be appreciated that, though not expressly illustrated in FIG. 5A, other operating states are possible. For example, the entire data stream may be transmitted in the white space subchannels in the licensed domain. Such an operating state may arise, for example, in geographic areas where there is a low density of digital television stations. Conversely, an operating state may arise in which all of the data is transmitted in the unlicensed spectrum. Such an operating state may arise, for example, in a geographic area with a high density of digital TV stations or in an environment where there is a source of interference spanning a large portion of the digital TV spectrum. Moreover, an operating state may exist where the combined bandwidth available for transmission in all of the domains used may be insufficient to achieve the bandwidth requested at block 501. In that scenario, lossy or lossless compression techniques may be employed to reduce the required bandwidth. Alternatively, the data transmission rate may be throttled, possibly reducing the quality of multimedia content contained in the stream if used for real time presentation of multimedia content. Though, regardless of the specific mode of operation, the process may proceed to block 508 where the system is configured for transmitting over whatever subchannels have been identified.

In act 508, the process 500 may inform a receiver of the subchannels to be used for transmission and obtains a data stream from an application to transmit in act 509. The receiver may be a specific receiver or the process 500 may broadcast the subchannels to be employed for transmission. This information may be exchanged with a remote computing device or presentation device, such as the television 111 (FIG. 1), during a pairing ceremony or other suitable process by which a transmitter and a receiver may coordinate action. The data stream may be any suitable data stream, and may be, for example a media stream (e.g., audio/video), or a stream produced by the application 301 in the example system of FIG. 3. The process 500 may next partition the data stream for transmission across the subchannels selected in acts 501-507. In act 509, the process may partition the data stream so that all available bandwidth in the identified white space channels is used. In other words, usage of the licensed domain subchannels (e.g., in the digital TV white space) may be maximized. The manner of partitioning data into multiple substreams may depend on the bit rates in the at least one white space subchannel as determined in act 504. The remaining data may be transmitted over the selected unlicensed subchannels.

Each data substream to be transmitted over a subchannel may be encoded using an EC encoder. Each subchannel may use a different encoder or multiple channels may use the same EC encoder. In act 510, the process 500 determines whether or not each substream is in a licensed domain. All unlicensed-domain substreams are encoded using a first EC coder in act 511, and all licensed-domain substreams are encoded using a second EC coder in act 512. Any suitable EC coder may be employed including, for example, coders using the LDPC and Turbo families of codes. The coding scheme applied may be a coding scheme selected to achieve the computed supported bit rate for each of the channels.

The encoded substreams are modulated and weighted in act 514 to produce a set of frequency components for controlling signal transmission in the associated subchannels. Any modulation schemes may be used, including, for example the digital and analog modulation schemes discussed with respect to FIG. 3. The modulation step may require a long FFT with unused spectral values zeroed out. The weighting step may employ weights that depend on the maximum allowed output power level in each frequency, and may, for example, be performed by a weighter such as the weighters 316 and 317 illustrated in FIG. 3.

In act 515, the weighted frequency components are then transmitted by a suitable radio, which may, as non-limiting example, be the radio 220 shown in FIG. 2. Aspects of the process 500 may be implemented in many different ways. For instance, the data substreams may be separately encoded, modulated, weighted and transmitted as in example system 300. Another example is that EC coding could be combined with modulation. Yet another example is that all subchannels may use the same EC coder, but different modulation schemes. Still other variations are possible.

After the data stream is transmitted in act 515, the process checks, in act 516, whether more data is to be transmitted. If there is no more data to be transmitted, the process 500 completes. Otherwise in act 517, the process checks whether the previously selected subchannels (both in licensed and unlicensed-domains) may still be used. This may be accomplished by checking whether a time interval allotted for transmission in each subchannel expired in act 517.

For each subchannel, if the time interval has not expired, the process 500 may continue in act 509 and further portions of the data stream may be transmitted on the subchannel, until the allotted time has expired and the process 500 needs to confirm whether or not the subchannel may still be used. This check occurs in act 518. If the subchannel remains available, then the process 500 may continue in act 509 and receive more data in the data stream for transmission.

If one of the subchannels on which a substream is being transmitted does not remain available, the substream allocation to subchannels may need to be altered. Any of numerous schemes for altering substream allocations to subchannels/frequencies is possible. For instance, given a first subchannel in a first regulatory (e.g. unlicensed) domain transmitting a first data substream and a second subchannel in a second regulatory (e.g., licensed) domain transmitting a second data substream, it may be that, at a certain time, the first subchannel remains available, while the second subchannel does not. In this case, one possibility is that transmission may continue only on the first subchannel (because e.g., no other licensed-domain subchannels are available). Another possibility is that the second data substream, which may no longer be transmitted on the second subchannel, may be split into a third and fourth substream. The third substream may be transmitted on a third unlicensed-domain subchannel, and the fourth substream may be transmitted on a fourth licensed-domain subchannel. Yet another example may be that both the first subchannel and the second subchannel become unavailable, for instance, due to a combination of user interference in the unlicensed domain and regulatory limitations in the licensed domain. In this case, new subchannels in both regulatory domains may need to be selected. Still another example is that more data may need be transmitted than before and even though the first and second subchannels may remain available, other subchannels may need to be allocated for transmitting the additional data. Alternatively or additionally, the proportion of a data stream transmitted in each of multiple subchannels may be altered for reasons other than availability of the subchannels. As one example, determinations may be made of the conditions, such as noise, in each of the subchannels, which may lead to a new computed value for the supported bit rate in the subchannel as performed at act 505. It should be recognized, that a subchannel may comprise at least one frequency and, therefore, even the change of availability of the at least single frequency may necessitate a data substream to subchannel reallocation. It should be appreciated that many other allocations of data substream to subchannels are possible.

All the above examples, and many others, may be realized by the process 500. If in step 518, at least one subchannel comprising at least one frequency remains unavailable, the process may continue in act 502 and attempt to obtain any available subchannels. For instance, newly obtained channels may be white space channels obtained in act 502 or unlicensed subchannels obtained in act 507. The existing data streams may be repartitioned in accordance with the new subchannel assignments in act 509. Once all the data has been transmitted, the process 500 completes.

Figure 6:
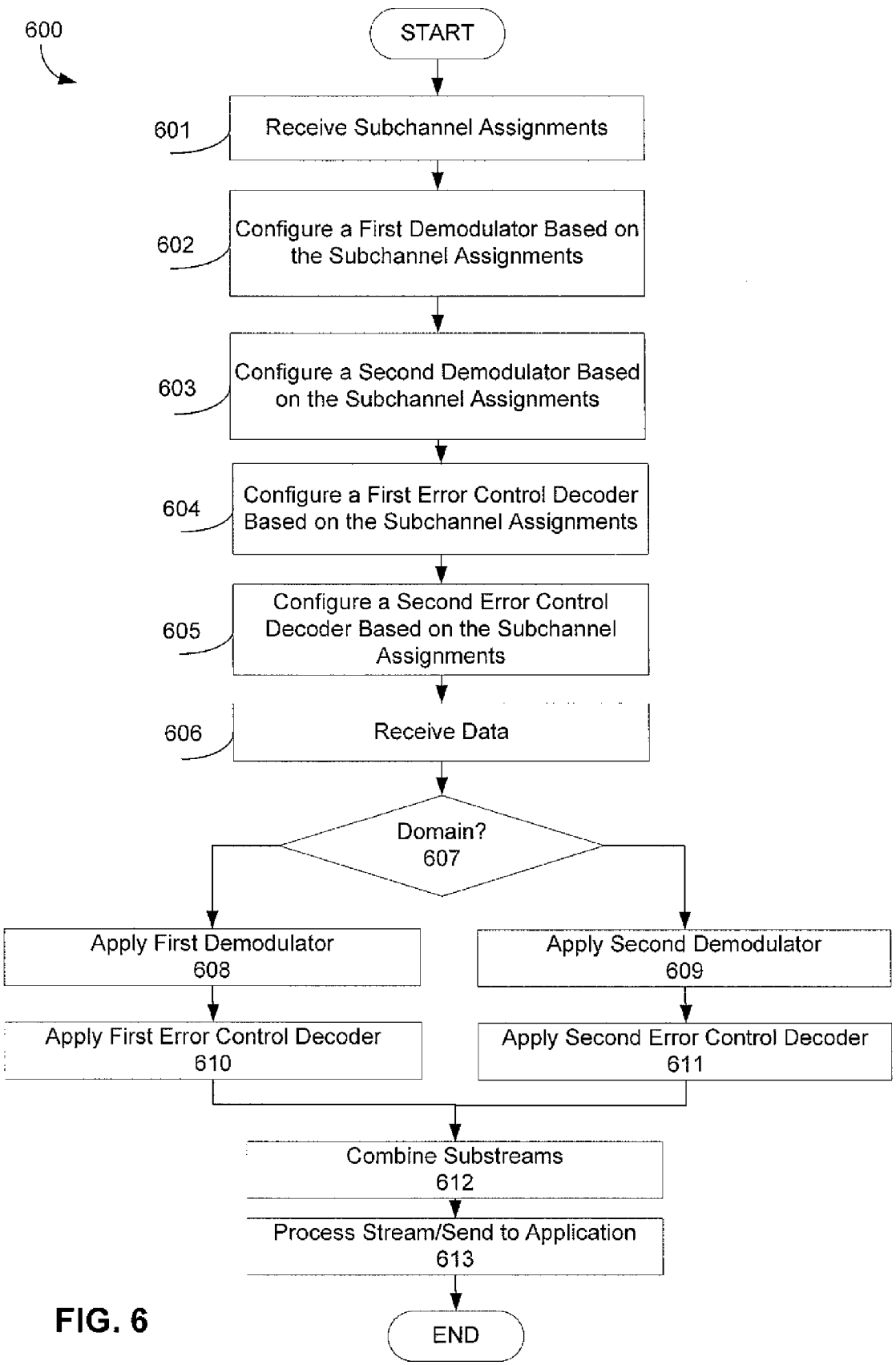
FIG. 6 shows an illustrative process for the reception of information over at least two regulatory domains, in accordance with some embodiments of the present disclosure.

FIG. 6 shows an illustrative process 600 for the reception of information over at least two regulatory domains, in accordance with some embodiments of the present disclosure. The process 600 begins in act 601 by receiving subchannel assignments, which may comprise a list of subchannels in licensed and unlicensed domains that a transmitter may be transmitting data on. The subchannel assignments may have been sent to the receiver, for instance, by a computer executing act 508 of the process 500. Alternatively, the subchannel assignments may have been broadcast over a network, pre-programmed or otherwise communicated.

The process 600 may configure a first and a second demodulator in acts 602 and 603, respectively. Further, the process 600 may configure a first EC decoder and a second EC decoder in acts 604 and 605, respectively. In some instances, the first and second demodulators may be the same, while in other instances they may be different. Similarly, the first and second EC coders may be the same in some instances and different in others. The configuration of demodulators and EC decoders may depend on the subchannel assignments. It may further depend on the EC coding and modulation schemes employed for the transmission of the data to be received on the assigned subchannels, so that the transmitted data may be appropriately demodulated and decoded.

In act 606, data is received on each of the assigned subchannels; whether or not each subchannel was in a licensed domain is determined in step 607. In the example process 600, all substreams transmitted over unlicensed-domain subchannels are demodulated using the first demodulator and decoded using the first EC decoder in acts 608 and 610, respectively. All substreams transmitted over licensed-domain subchannels demodulated using the second demodulator and decoded using the second EC decoder in acts 609 and 611, respectively. However, the invention is not limited in this respect as each individual substream may have its own EC decoder and demodulator and/or various groups of subchannels (i.e., not just the licensed/unlicensed grouping) may share an EC decoder and a demodulator. For instance, a single modulation scheme may be used for a contiguous block of multiple frequencies, of which at least one lies in a licensed domain and at least one lies may lie in an unlicensed domain.

The substreams are next combined, in act 612 and further processed in act 613. Further processing may involve sending the resultant data stream to an application (e.g., the application 401 shown in FIG. 4). It may also involve modifying the data in any suitable way. Yet another example is rendering a display device, such as a television, to display the data stream, which is useful if the data stream is a media stream. The process 600 then completes.

Figure 7:
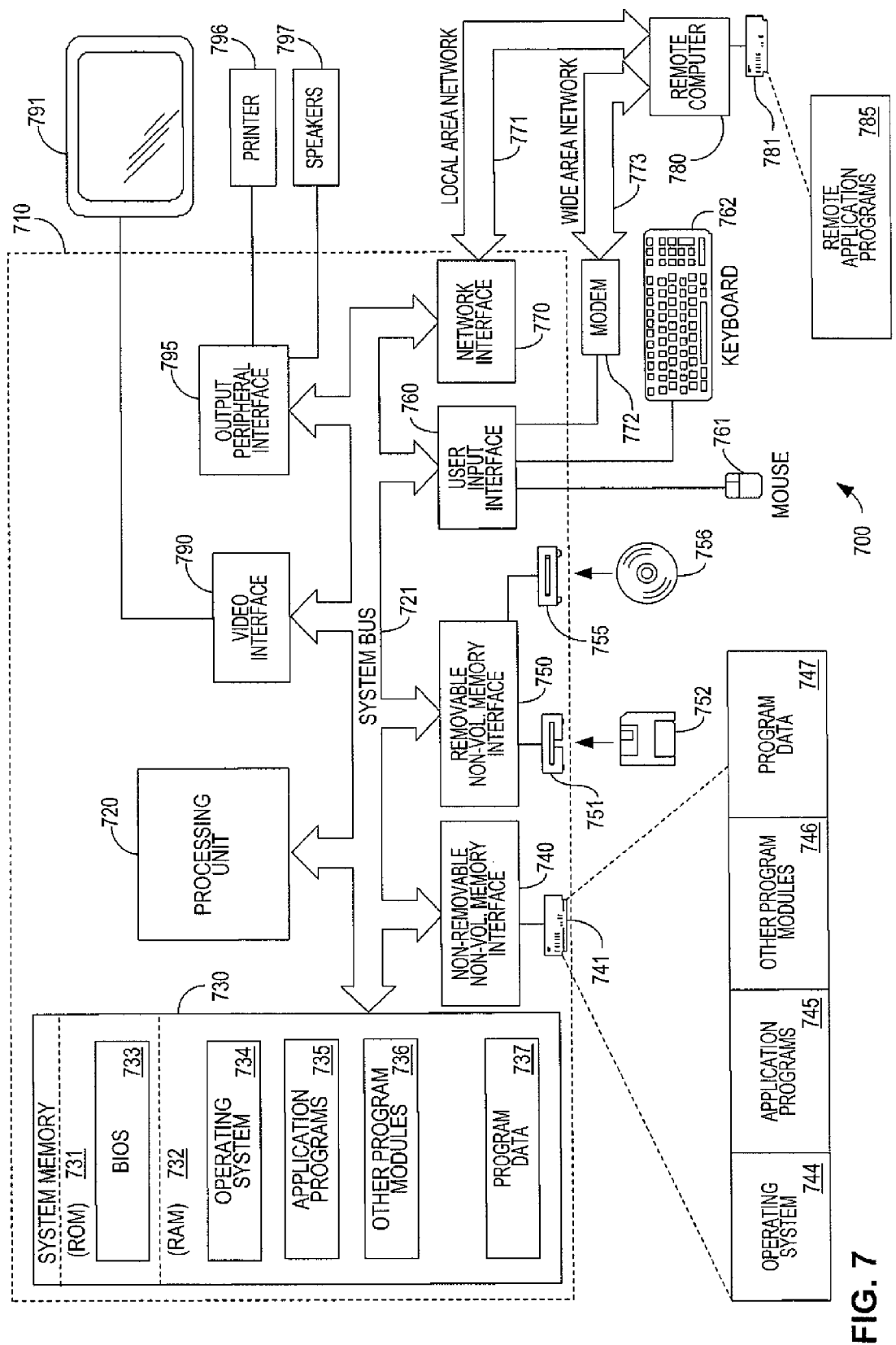
FIG. 7 is a block diagram generally illustrating an example of a computer system that may be used in implementing aspects of the present disclosure.

FIG. 7 illustrates an example of a suitable computing system environment 700 on which the invention may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of a computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communication network. In a distributed computing environment, program modules may be located in both local and remote computer storage media including memory storage devices.

With reference to FIG. 7, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system 721, may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 710. Combinations of the any of the above should also be included within the scope of computer readable storage media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable volatile/nonvolatile computer storage media. By way of example only, FIG. 7 illustrates a hard disk drive 740 that reads from or write to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media, discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies.

A user may enter commands and information into the computer 710 through input devices such as a keyboard 762 and pointing device 761, commonly referred to as a mouse, trackball or touch pad. Other input devices may include a microphone 763, joystick, a tablet 764, satellite dish, scanner, or the like. These and other input devices are often connected to the processing unit 720 through a user input interface 760 that is coupled to the system bus, but may not be connected by other interface and bus structures, such as a parallel port, game port or a universal serial bus (USB). A monitor 791 or other type of display device is also connected to the system 721 via an interface, such as a video interface 790. In addition to the monitor, computers may also include other peripheral output devices such as speakers 797 and printer 796, which may be connected through a output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773 and a wireless link, for example via a wireless interface 797 complete with an antenna, but may also include other networks. Such networking environments are commonplace in offices, enterprise-wide computer networks, intranets and the Internet. While wireless interface 797 is shown directly connected to system bus 721, it is recognized that the wireless interface 797 may be connected to system bus 721 via network interface 770.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, an embodiment was described in which power level is set in the regulated domain to be the maximum permitted power level. In some embodiments, the power level in each subchannel in the licensed domain may be set in conjunction with the power levels used for transmission in the unlicensed domain. Such an approach may allocate more power to better subchannels, regardless of the domain, up to any limits imposed by regulation or limits on total transmission power that may be imposed by policy on the computing device. Such an allocation may be performed according to a technique known as the Shannon water-filling technique. Allocating power in this manner may improve the overall rate at which information is communicated.

As another example, an embodiment was described in which a weight is applied to each of a plurality of substreams to be transmitted in a respective domain after a modulator generates frequency coefficients in the respective domains. Alternatively or additionally, a weight may be applied to signals at the input of a modulator. Such an approach may be useful, for example, if the same weights are to be used in different subchannels within the same regulatory domain.

Also, an embodiment is described in which a separate modulator and other components may be used for separate substreams. In other embodiments, a single modulator may be used. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable storage medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computing device, comprising:
    at least one radio,
    at least one memory; and
    at least one processor, wherein the at least one memory and the at least one processor are respectively configured to store and execute instructions that cause the wireless computing device to perform operations, the operations comprising:
        receiving a first portion of the data over at least one frequency in a first regulatory domain;
        receiving a second portion of the data over at least one frequency in a second regulatory domain, including:
            receiving the second portion over a first set of subchannels in the second regulatory domain;
        detecting a change in the at least one frequency in the second regulatory domain employed for data transmission;
        subsequently receiving a third portion of the data over a second set of subchannels in the second regulatory domain, wherein the second set of subchannels is different than the first set of subchannels; and
        generating output data from the first portion, the second portion, and the third portion.

2. The computing device of claim 1, wherein the operations further comprise:
    detecting another change in the at least one frequency in the second regulatory domain; and
    subsequently detecting data over subchannels in the first regulatory domain without concurrently receiving data over subchannels in the second regulatory domain.

3. The computing device of claim 1, wherein:
    the output data comprises audio/video content; and
    wherein the operations further comprise displaying the audio/video content.

4. The computing device of claim 1, wherein:
    the first portion of the data and the second portion of the data are received via a single radio that is configured to wirelessly receive data via the first regulatory domain and via the second regulatory domain.

5. The computing device of claim 1, wherein:
    the first regulatory domain is a UNII domain or an ISM domain; and
    the second regulatory domain is a digital TV domain.

6. The computing device of claim 1, wherein the second portion of the data was transmitted to the computing device by another computing device at a transmit power level that was determined based at least in part on regulatory constraints for the second regulatory domain.

7. The computing device of claim 1, wherein the second portion of the data was transmitted to the computing device by another computing device with an error control coding rate that was based at least in part on transmission characteristics of the at least one frequency in the second regulatory domain and a determined transmit power level.

8. A method of transmitting data over a wireless medium, the method comprising:
    dynamically determining at least one frequency in a first regulatory domain;
    dynamically determining at least one frequency in a second regulatory domain;
    determining a transmit power level for the at least one frequency in the second regulatory domain based at least in part on regulatory constraints for the second regulatory domain;
    transmitting at least the first portion using the at least one frequency in the first regulatory domain; and
    transmitting the second portion using the at least one frequency in the second regulatory domain concurrently with the transmitting of at least the first portion using the at least one frequency in the first regulatory domain.

9. The method of claim 8, further comprising:
    determining an error control coding rate for transmission of the second portion of the data based at least in part on transmission characteristics of the at least one frequency in the second regulatory domain and the determined transmit power level.

10. The method of claim 9, wherein the error control coding rate for transmission of the second portion is based on a Shannon water-filling approach.

11. The method of claim 9, wherein:
    the first portion of the data and the second portion of the data are transmitted via a single radio that is configured to wirelessly transmit data via multiple frequencies.

12. The method of claim 8, wherein:
    the first regulatory domain is a UNII domain or an ISM domain; and
    the second regulatory domain is a digital TV domain.

13. The method of claim 8, further comprising:
    determining whether the at least one frequency in the second regulatory domain remains available; and
    in response to a determination that the at least one frequency in the second regulatory domain is unavailable, transmitting data using the at least one frequency in the first regulatory domain without concurrently using the at least one frequency in the second regulatory domain.

14. The method of claim 8, further comprising:
    determining a first time variant function for the first regulatory domain;
    determining a second time variant function for the second regulatory domain;

transmitting at least the first portion via the at least one frequency in the first regulatory domain according to the first time variant function; and transmitting at least the second portion via the at least one frequency in the second regulatory domain according to the second time variant function.

15. A method of receiving data via a wireless medium, the method comprising:

receiving, by a computing device, a first portion of the data over at least one frequency in a first regulatory domain;

receiving, by the computing device, a second portion of the data over at least one frequency in a second regulatory domain, including:

receiving the second portion over a first set of subchannels in the second regulatory domain;

subsequently receiving a third portion of the data over a second set of subchannels in the second regulatory domain following a change in the at least one frequency in the second regulatory domain that is employed for data transmission in the second regulatory domain, wherein the second set of subchannels is different than the first set of subchannels; and generating output data from the first portion of the data, the second portion of the data, and the third portion of the data.

16. The method of claim 15, further comprising:

detecting another change in the at least one frequency in the second regulatory domain; and subsequently detecting data over subchannels in the first regulatory domain without concurrently receiving data over subchannels in the second regulatory domain.

17. The method of claim 15, wherein:

the output data comprises audio/video content; and wherein the method further comprises displaying the audio/video content.

18. The method of claim 15, wherein:

the first portion of the data and the second portion of the data are received via a single radio that is configured to wirelessly receive data via the first regulatory domain and via the second regulatory domain.

19. The method of claim 15, wherein:

the first regulatory domain is a UNII domain or an ISM domain; and the second regulatory domain is a digital TV domain.

20. The method of claim 15, wherein the second portion of the data was transmitted to the computing device by another computing device at a transmit power level that was determined based at least in part on regulatory constraints for the second regulatory domain.

* * * * *